(12) United States Patent
Byun

(10) Patent No.: US 12,074,638 B2
(45) Date of Patent: Aug. 27, 2024

(54) ELECTRONIC DEVICE AND INFRARED COMMUNICATION METHOD BASED ON INTERFERENCE DETECTION IN ELECTRONIC DEVICE

(71) Applicant: SAMSUNG ELECTRONICS CO., LTD., Suwon-si (KR)

(72) Inventor: Kangho Byun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 441 days.

(21) Appl. No.: 17/285,297

(22) PCT Filed: Dec. 11, 2019

(86) PCT No.: PCT/KR2019/017450
§ 371 (c)(1),
(2) Date: Apr. 14, 2021

(87) PCT Pub. No.: WO2020/122578
PCT Pub. Date: Jun. 18, 2020

(65) Prior Publication Data
US 2021/0367667 A1  Nov. 25, 2021

(30) Foreign Application Priority Data

Dec. 11, 2018 (KR) .......................... 10-2018-0159299

(51) Int. Cl.
*H04B 10/079* (2013.01)
*G01J 9/02* (2006.01)
*H04B 10/077* (2013.01)

(52) U.S. Cl.
CPC ...... *H04B 10/07955* (2013.01); *G01J 9/0246* (2013.01); *H04B 10/0775* (2013.01)

(58) Field of Classification Search
CPC .......... H04B 10/07955; H04B 10/0775; H04B 10/1143; H04B 10/114; H04B 10/43;
(Continued)

(56) References Cited

U.S. PATENT DOCUMENTS

| 2011/0063115 A1* | 3/2011 | Kishimoto | ................ F21K 9/00 |
| | | | 250/206 |
| 2012/0087671 A1* | 4/2012 | Eber | ................... H04B 10/1143 |
| | | | 398/106 |
| 2018/0109784 A1 | 4/2018 | Bly, Jr. | |

FOREIGN PATENT DOCUMENTS

| KR | 10-2005-0095441 | 9/2005 |
| KR | 10-2009-0075491 | 7/2009 |
| KR | 10-2016-0048347 | 5/2016 |

OTHER PUBLICATIONS

International Search Report for PCT/KR2019/017450 dated Mar. 26, 2020, 5 pages.

(Continued)

*Primary Examiner* — Hibret A Woldekidan
(74) *Attorney, Agent, or Firm* — Nixon & Vanderhye, P.C.

(57) ABSTRACT

Provided are various embodiments related to an electronic device. According to an embodiment, an electronic device may comprise: an IR (infrared light) transmission unit for outputting IR light; an IR reception unit for receiving IR light; and processor. The processor is configured to: identify a first IR transmission signal to be transmitted to an external device; identify a first time interval and a second time interval, which correspond to the first IR transmission signal; output first IR light corresponding to at least a part of the first IR transmission signal through the IR transmission unit in the first time interval; identify whether second IR light having the intensity larger than or equal to a threshold is received by the IR reception unit in the second time interval;

(Continued)

and when the second IR light having the intensity larger than or equal to the threshold is received by the IR reception unit in the second time interval, interrupt transmission of the IR transmission signal. In addition, other embodiments may be possible.

16 Claims, 16 Drawing Sheets

(58) Field of Classification Search
CPC . H04B 10/1149; H04B 10/11; H04B 10/1141; H04B 10/564; H04B 10/07953; H04B 10/0797; H04B 10/0799; H04B 10/0777; H04B 10/0795; H04B 10/40; H04B 10/50; G01J 9/0246
USPC ....... 398/158, 25, 26, 35, 38, 106, 118, 127, 398/128, 135
See application file for complete search history.

(56) References Cited

OTHER PUBLICATIONS

Written Opinion of the ISA for PCT/KR2019/017450 dated Mar. 26, 2020, 4 pages.
Office Action dated Nov. 23, 2022 in counterpart Korean Patent Application No. 10-2018-0159299 and English-language translation.

* cited by examiner

| Format | Lead 510 | | Bit 0 520 | | Bit 1 530 | | End 540 | |
|---|---|---|---|---|---|---|---|---|
| | High | Low | High | Low | High | Low | High | Low |
| NEC | 9 | 4.5 | 0.562 | 0.562 | 0.562 | 1.675 | 0.562 | - |
| RC5 | 0.889x3 | 0.889x3 | 0.889 | 0.889 | 0.889 | 0.889 | - | - |
| RC6 | 2.685 | 0.895 | 0.895 | 0.895 | 0.895 | 0.895 | - | - |
| RCMM | 0.4167 | 0.2778 | 0.1667 | 0.2778/0.444/0.611/0.7778 | 0.2778/0.444/0.611/0.7778 | - | - | - |
| SIRCS(Sony) | 2.4 | 0.6 | 0.6 | 0.6 | 1.2 | 0.6 | - | - |
| JVC | 8.4 | 4.2 | 0.526 | 0.564 | 0.526 | 1.574 | 0.526 | - |
| Sharp | - | - | 0.32 | 0.68 | 0.32 | 1.68 | 0.32 | - |
| Panasonic | 3.52 | 3.52 | 0.88 | 0.88 | 0.88 | 2.64 | 3.52+0.88 | 3.52 |
| TC9012 | 4.5 | 4.5 | 0.56 | 0.56 | 0.56 | 1.68 | 0.56 | - |

FIG.5

ELECTRONIC DEVICE AND INFRARED COMMUNICATION METHOD BASED ON INTERFERENCE DETECTION IN ELECTRONIC DEVICE

CROSS-REFERENCE TO RELATED APPLICATION(S)

This application is a National Phase Entry of PCT International Application No. PCT/KR2019/017450, which was filed on Dec. 11, 2019 and claims priority to Korean Patent Application No. 10-2018-0159299, which was filed on Dec. 11, 2018 in the Korean Intellectual Property Office, the contents of which are incorporated herein by reference.

BACKGROUND

1. Field

Various embodiments relate to infrared communication.

2. Description of the Related Art

Recent development of information/communication technology, semiconductor technology, and the like has been followed by rapidly-increasing widespread use of various kinds of electronic devices. Particularly, recent electronic devices can provide a mobile communication function, and are providing various additional functions such as a camera function, a moving image capture function, a radio broadcast receiving function, a music playback function, an acupressure function, a blood glucose level sensing function, a blood alcohol measuring function, an ultrasonic imaging function, a text message transmitting function, a multimedia message transmitting function, an electronic dictionary function, and a short-range wireless communication function.

The short-range wireless communication function may be a function that enables an electronic device to communicate with an external device in a short range, such as an infrared communication function.

Infrared rays are a type of electromagnetic waves having the characteristics of both radio waves and light waves. Infrared rays correspond to short-wavelength electromagnetic waves (wavelengths of 750-3000 nm) and may be positioned in a band below red, among visible rays, which has the lowest frequency. Bands of interest in connection with infrared communication are near-infrared rays, which has wavelengths of 380-750 nm, and which may be mainly used for infrared communication.

In connection with the infrared communication function, infrared data association (IrDA) communication, for example, is less expensive to implement and is easy to use, and utilization thereof is accordingly increasing.

IrDA refers to an organization established in 1993 with the support from the industry to define standards regarding hardware and software to be used for infrared communication. The same name of a civil standardization group is used to refer to the standard in which multiple global companies participate. According to the IrDA standard, a concentrated ray in a THz-unit infrared frequency band may be modulated together with information and transmitted from a transmitter to a receiver in a relatively short range.

For example, infrared communication may refer to communication between an infrared transmitter and an infrared receiver. The infrared transmitter may transmit bit-unit data by using infrared (IR) light, and the IR receiver may receive binary data by receiving IR light according to a synchronization signal corresponding to the transmission rate of the IR transmitter.

SUMMARY

When an IR transmitter transmits a signal to an IR receiver by using IR light, it is highly likely that an error or a signal collision will occur. According to a conventional method for sensing the occurrence of an error during IR communication, the IR transmitter transmits a signal (or a packet) including a value for error checking, and the IR receiver then receives the transmitted signal and checks if an error has occurred in the received signal by using the value for error checking. For example, an IR receiver according to IRPHY (IRDA physical layer standard) may confirm whether effective values are included at the start and end of a received packet and may perform a frame check sequence (FSC) which indicates if bits are damaged, thereby confirming whether or not an error or a signal collision has occurred.

According to the conventional method for checking errors or signal collisions, only the receiving side can check, after receiving a signal transmitted by the transmitting side, whether or not an error or a signal collision has occurred in the received signal. In other words, the transmitting side may not be able to check whether a signal that is being transmitted or has been transmitted has an error. In addition, the receiving side may be able to check if a received signal has an error or a signal collision after receiving the same, but may be unable to confirm whether a signal that is being received has an error.

Various embodiments may provide an electronic device and an IR communication method for the electronic device, wherein, during IR signal transmission, it is possible to check if an IR signal that is being transmitted has an error or a collision.

Various embodiments may provide an electronic device and an IR communication method for the electronic device, wherein during IR signal reception, it is possible to check if an IR signal that is being received has an error or a collision.

Various embodiments may provide an electronic device and an IR communication method for the electronic device, wherein, if it is confirmed that an IR signal that is being transmitted or received has an error or a collision, the transmission or reception of the IR signal is stopped, and the IR signal to be transmitted or received is retransmitted or re-received, thereby shortening the transmission time.

According to various embodiments, an electronic device may include: an IR (infrared light) transmitter configured to output IR light; an IR receiver configured to receive IR light; and a processor, wherein the processor is configured to: identify a first IR transmission signal to be transmitted to an external device; identify a first time interval and a second time interval corresponding to the first IR transmission signal; output first IR light corresponding to at least a part of the first IR transmission signal through the IR transmitter in the first time interval; identify whether second IR light having an intensity of a threshold or higher is received by the IR receiver in the second time interval; and in response to receiving the second IR light having an intensity of the threshold or higher by the IR receiver in the second time interval, stop transmitting the first IR transmission signal.

According to various embodiments, an electronic device may include: an IR receiver configured to receive IR light; and a processor, wherein the processor is configured to: identify a first time interval and a second time interval corresponding to a first IR transmission signal received from an external device; receive first IR light corresponding to at least a part of the first IR transmission signal from the external device in the first time interval; identify whether second IR light having an intensity of a threshold or higher is received in the second time interval; and in response to receiving the second IR light in the second time interval, stop receiving the first IR transmission signal.

According to various embodiments, an infrared communication method for an electronic device may include: identifying a first IR transmission signal to be transmitted to an external device; identifying a first time interval and a second time interval corresponding to the first IR transmission signal; outputting first IR light corresponding to at least a part of the first IR transmission signal through an IR transmitter in the first time interval; identifying whether second IR light having an intensity of a threshold or higher is received by an IR receiver in the second time interval; and in response to receiving the second IR light by the IR receiver in the second time interval, stopping transmitting the first IR transmission signal.

According to various embodiments, an infrared communication method for an electronic device may include: identifying a first time interval and a second time interval corresponding to a first IR transmission signal received from an external device; receiving first IR light corresponding to at least a part of the first IR transmission signal from the external device in the first time interval; identifying whether second IR light having an intensity of a threshold or higher is received in the second time interval; and in response to receiving the second IR light in the second time interval, stopping receiving the first IR transmission signal.

Various embodiments may provide a storage medium in which commands are stored, the commands being configured to, when executed by at least one circuit, cause the at least one circuit to perform at least one operation, wherein the at least one operation includes: identifying a first IR transmission signal to be transmitted to an external device; identifying a first time interval and a second time interval corresponding to the first IR transmission signal; outputting first IR light corresponding to at least a part of the first IR transmission signal through the IR transmitter in the first time interval; identifying whether second IR light having an intensity of a threshold or higher is received by the IR receiver in the second time interval; and in response to receiving the second IR light by the IR receiver in the second time interval, stopping transmitting the first IR transmission signal.

According to various embodiments, before IR signal transmission is completed by an electronic device, it is possible to check if the IR signal that is being transmitted has an error or a collision.

According to various embodiments, before IR signal reception is completed by an electronic device, it is possible to check if the IR signal that is being received has an error or a collision.

According to various embodiments, it is checked if an IR signal that is being transmitted or received has an error or a collision before the transmission or reception of the IR signal is completed, the transmission or reception of the IR signal is accordingly stopped, and the IR signal to be transmitted or received is retransmitted or re-received, thereby shortening the transmission time.

BRIEF DESCRIPTION OF THE DRAWINGS

FIG. 5 is a diagram illustrating an example of a format of an IR signal according to various embodiments;

DETAILED DESCRIPTION

Figure 1:
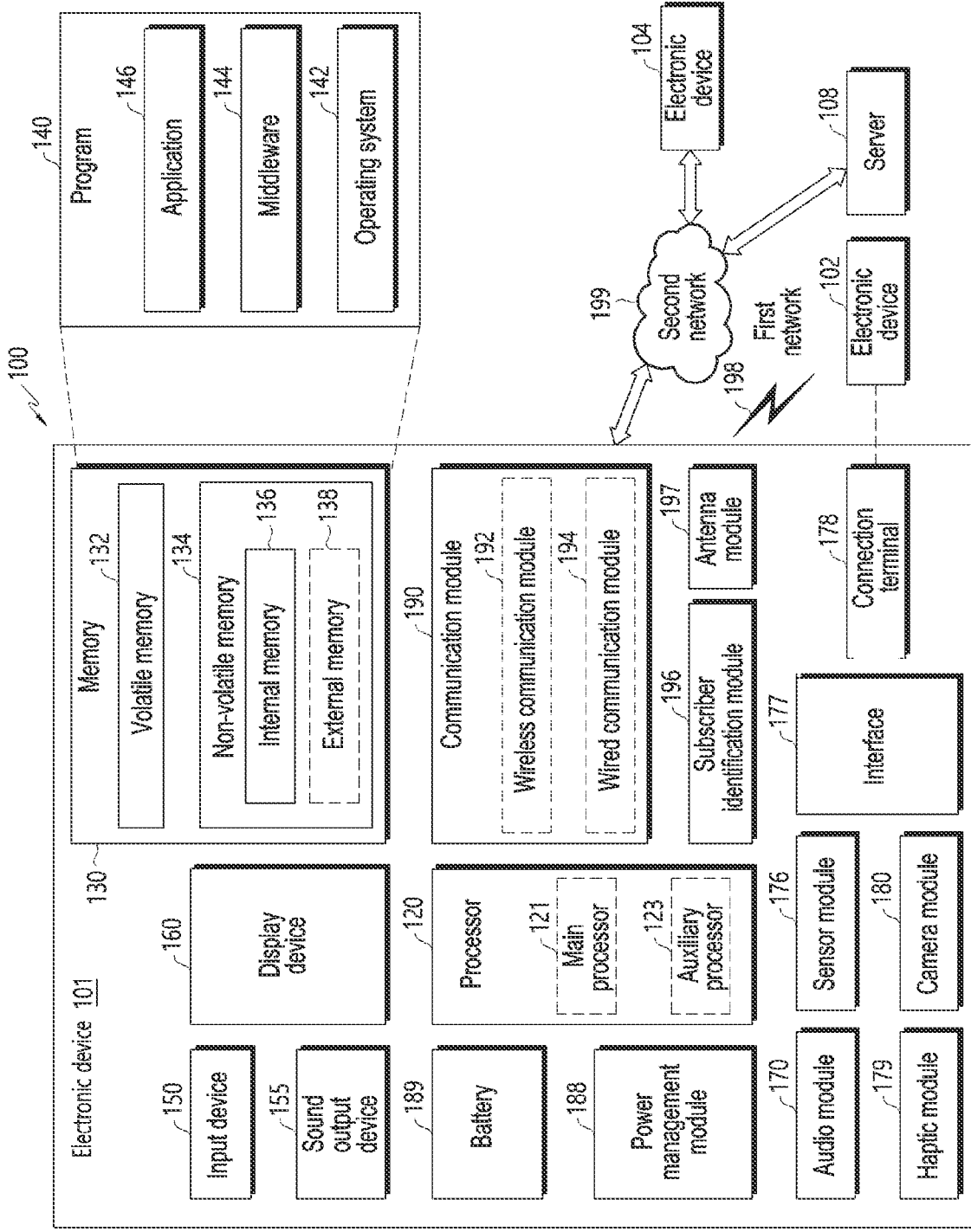
FIG. 1 is a block diagram of an electronic device in a network environment according to various embodiments.

FIG. 1 is a block diagram of an electronic device 101 in a network environment 100 according to various embodiments.

Referring to FIG. 1, in the network environment 100, the electronic device 101 may communicate with an electronic device 102 through a first network 198 (e.g., a short-range wireless communication network), or may communicate with an electronic device 104 or a server 108 through a second network 199 (e.g., a long-range wireless communication network). According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In an embodiment, at least one (e.g., the display device 160 or the camera module 180) of the elements described above may be omitted from the electronic device 101, or one or more other elements may be added thereto. In an embodiment, some of the elements may be implemented as one integrated circuit. For example, the sensor module 176 (e.g., a fingerprint sensor, an iris sensor, or an illuminance sensor) may be implemented as being embedded in the display device (160) (e.g., a display).

The processor 120 may, for example, execute software (e.g., a program 140) to control at least one other element (e.g., a hardware or software element) of the electronic device 101 connected to the processor 120, and may perform various data-processing operations or calculations. According to an embodiment, as at least a part of the data-processing operations or calculations, the processor 120 may load, in a volatile memory 132, a command or data received from another element (e.g., the sensor module 176 or the communication module 190), process the command or data stored in the volatile memory 132, and store the resultant data in a nonvolatile memory 134. According to an embodiment, the processor 120 may include a main processor 121 (e.g., a central processing device, or an application processor), and an auxiliary processor 123 (e.g., a graphics processing device, an image signal processor, a sensor hub processor, or a communication processor) which can be operated independently from or together with the main processor. Additionally or alternatively, the auxiliary processor 123 may be configured to use lower power than the main processor (121) or to specialize in a designated function. The auxiliary processor 123 may be implemented as a part of the main processor 121, or separately therefrom.

The auxiliary processor 123 may, for example, control at least a part of functions or states related to at least one element (e.g., the display device 160, the sensor module 176, or the communication module 190) among the elements of the electronic device 101 on behalf of the main processor 121 while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as a part of another element (e.g., the camera module 180 or the communication module 190) that is functionally related to the auxiliary processor.

The memory 130 may store various data used by at least one element (e.g., the processor 120 or the sensor module 176) of the electronic device 101. The data may include, for example, software (e.g., the program 140), and input data or output data of a command related thereto. The memory 130 may include the volatile memory 132 or the nonvolatile memory 134.

The program 140 may be stored in the memory 130 as software and, for example, may include an operating system 142, middleware 144, or an application 146.

The input device 150 may receive a command or data to be used for an element (e.g., the processor 120) of the electronic device 101 from the outside of the electronic device 101 (e.g., from a user). The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes such as playback of multimedia or recording, and the receiver may be used to receive an incoming call. According to an embodiment, the receiver may be implemented separately from the speaker, or as a part thereof.

The display device 160 may visually provide information to the outside of the electronic device 101 (e.g., to a user). The display device 160 may include, for example, a display, a hologram device, or a projector, as well as a control circuit for controlling a corresponding device. According to an embodiment, the display device 160 may include touch circuitry configured to sense a touch, or sensor circuitry (e.g., a pressure sensor) configured to measure the level of force generated by the touch.

The audio module 170 may convert sound into an electrical signal, or conversely may convert an electrical signal into sound. According to an embodiment, the audio module 170 may obtain sound through the input device 150, or may output sound through the sound output device 155, or an external electronic device (e.g., the electronic device 102) (e.g., a speaker or a headphone) that is directly or wirelessly connected to the electronic device 101.

The sensor module 176 may sense an operation state (e.g., power or temperature) of the electronic device 101 or an external environment state (e.g., a user's state), and generate an electrical signal or a data value corresponding to the sensed state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols which are usable for the electronic device 101 to be directly or wirelessly connected to an external electronic device (e.g., the electronic device 102). According to an embodiment, the interface 177 may include, for example, a high-definition multimedia interface (HDMI), a universal serial bus (USB) interface, an SD card interface, or an audio interface.

A connection terminal 178 may include a connector through which the electronic device 101 can be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into an electrical stimulus, or a mechanical stimulus (e.g., vibration or movement) which a user can recognize through his/her tactile or kinesthetic sense. According to an embodiment, the haptic module 179 may include, for example, a motor, a piezoelectric element, or an electrostimulator.

The camera module 180 may capture a still image or a moving image. According to an embodiment, the camera module 180 may include one or more lenses, image sensors, image signal processors, or flashes.

The power management module 188 may manage the power supplied to the electronic device 101. According to an embodiment, the power management module 388 may be implemented, for example, as at least a part of a power management integrated circuit (PMIC).

The battery 189 may supply power to at least one element of the electronic device 101. According to an embodiment, the battery 189 may include, for example, a non-rechargeable primary battery, a rechargeable secondary battery, or a fuel battery.

The communication module 190 may support establishment of a direct (e.g., wired) communication channel or a wireless communication channel between the electronic device 101 and an external electronic device (e.g., the electronic device 102, the electronic device 104, or the server 108), and execution of communication through an established communication channel. The communication module 190 may be operated independently from the processor 120 (e.g., an application processor), and may include one or more communication processors supporting direct (e.g., wired) communication or wireless communication. According to an embodiment, the communication module 190 may include a wireless communication module 192 (e.g., a cellular communication module, a short-range wireless communication module, or a global navigation satellite system (GNSS) communication module), or a wired communication module 194 (e.g., a local area network (LAN) communication module or a power-line communication module). A corresponding communication module among the communication modules described above may communicate with an external electronic device through the first network 198 (e.g., a short-range communication network such as Bluetooth, Wi-Fi direct, or infrared data association (IrDA)), or the second network 199 (e.g., a long-range communication network such as a cellular network, the Internet, or a computer network (e.g., a LAN or WAN)). Various types of communication modules as described above may be integrated into one element (e.g., a single chip), or may be implemented as multiple separate elements (e.g., multiple chips). The wireless communication module 192 may identify or authenticate the electronic device 101 in a communication network, such as the first network 198 or the second network 199, by using subscriber information (e.g., an international mobile subscriber identifier (IMSI)) stored in the subscriber identification module 196.

The antenna module 197 may transmit a signal or power to the outside (e.g., an external electronic device) or may receive same from the outside. According to an embodiment, the antenna module may include a single antenna including a radiator including a conductive pattern or a conductor disposed on a substrate (e.g., a PCB). According to an embodiment, the antenna module 197 may include multiple antennas. At least one antenna suitable for a communication scheme used in a communication network, such as the first network 198 or the second network 199, may be selected, for example, from among the multiple antennas by the communication module 190. A signal or power may be transmitted or received between the communication module 190 and an external electronic device through the selected at least one antenna. According to an embodiment, another component (e.g., an RFIC) other than the radiator may be additionally provided as a part of the antenna module 197.

At least a part of the elements described above may be connected to each other through a communication scheme between surrounding devices (e.g., a bus, a general-purpose input/output (GPIO), a serial peripheral interface (SPI), or a mobile industry processor interface (MIPI)), and may exchange a signal (e.g., a command or data) with each other.

According to an embodiment, a command or data may be transmitted or received between an electronic device 101 and the external electronic device 104 through the server 108 connected to the second network 199. Each of the electronic devices 102 and 104 may be a device that is of a type identical to or different from that of the electronic device 101. According to an embodiment, all or a part of the operations executed in the electronic device 101 may be executed in one or more external electronic devices among the external electronic devices 102, 104, or 108. For example, in the case where the electronic device 101 is required to perform a function or service automatically or in response to a request from a user or another device, the electronic device 101 may request one or more external electronic devices to perform at least a part of the function or service, in addition to or instead of executing the function or service by itself. The one or more external electronic devices having received the request may execute at least a part of the requested function or service, or an additional function or service related to the request, and may transfer a result of the execution to the electronic device 101. The electronic device 101 may or may not additionally process the result, and may provide the processed result as at least a part of a response for the request. To this end, for example, cloud-computing, distributed-computing, or client-server-computing technologies may be used.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

According to various embodiments, the electronic device 101 may perform infrared communication with the electronic device 102 by using a short-range communication module (e.g., an infrared communication module or an infrared data association (IrDA) communication module) included in the communication module 190. For example, an infrared communication module may include an infrared (IR) transmitter and/or IR receiver. The electronic device 101 may be operated as a transmission side which transmits an infrared signal to the electronic device 102 through the IR transmitter, or may be operated as a reception side which receives an infrared signal from the electronic device 102 through the IR receiver.

Figure 2:
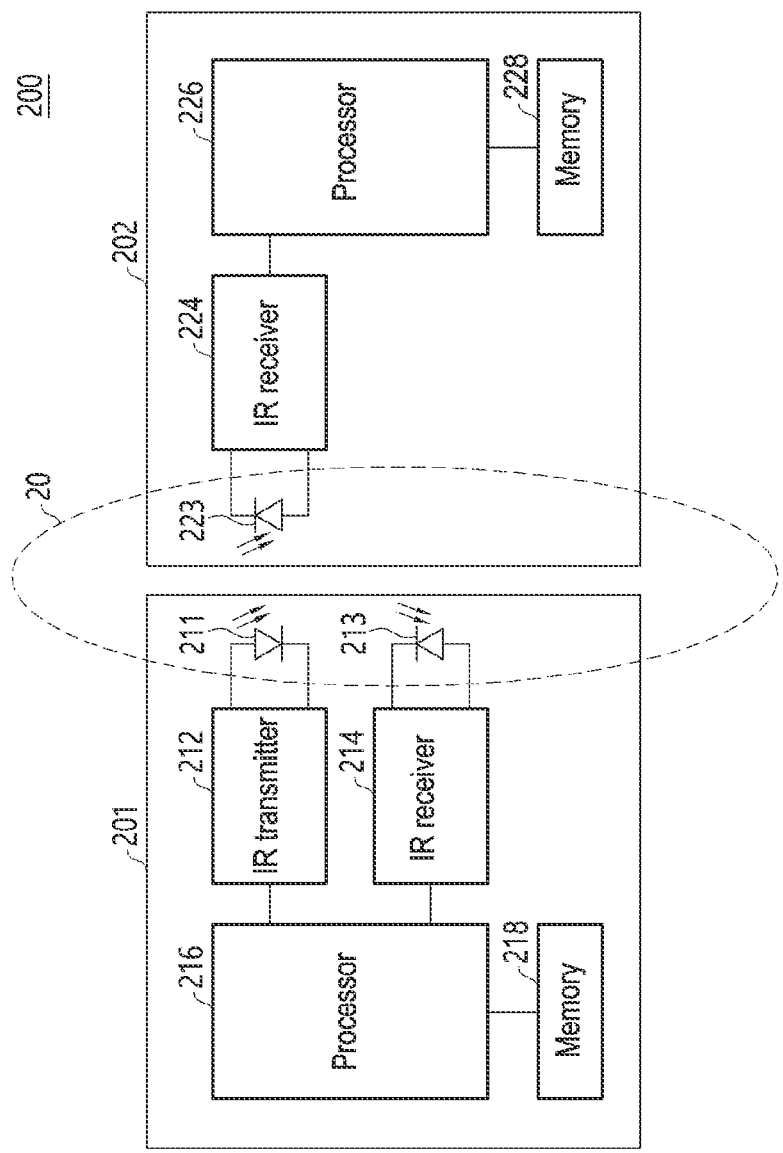
FIG. 2 is a block diagram of a first electronic device and a second electronic device according to various embodiments.

FIG. 2 is a block diagram 200 of a first electronic device and a second electronic device according to various embodiments.

Referring to FIG. 2, each of a first electronic device 201 and a second electronic device 202 according to an embodiment may include the entirety or a part of the electronic device 101 illustrated in FIG. 1. According to an embodiment, the electronic device 101 illustrated in FIG. 1 may include the entirety or a part of the first electronic device 201, or include the entirety or a part of the second electronic device 202, and may perform a function of the first electronic device 201, or perform a function of the second electronic device 202.

According to an embodiment, the first electronic device 201 and the second electronic device 202 may support an infrared communication protocol. According to an embodiment, the infrared communication protocol may include a communication protocol based on an infrared data association (IrDA) standard.

According to various embodiments, the first electronic device 201 may include an infrared (IR) transmitter 212, an infrared (IR) receiver 214, a processor 216, and/or a memory 218.

According to an embodiment, the IR transmitter 212 may convert (modulate) a data packet to be transmitted, into an IR transmission signal (hereinafter, also referred to as a "first IR transmission signal"), and may output IR light (hereinafter, also referred to as "first IR light") corresponding to the modulated IR transmission signal through a light emitting element 211. According to various embodiments, the IR transmitter 212 may transmit a first transmission signal corresponding to a data packet to be transmitted, based on a designated IrDA-based modulation scheme. According to an embodiment, the IR transmitter 212 may transmit a first IR transmission signal by a scheme of outputting first IR light through the light emitting element 211 according to a designated first voltage (V1) (hereinafter, also referred to as a "high voltage" or "High") in a first time interval, based on a logical value (e.g., "1" or "0") of a bit included in a data packet, or not outputting light according to a designated second voltage (V2) (hereinafter, also referred to as a "low voltage" or "Low") in a second time interval. For example, the IR transmitter 212 may generate a modulation (e.g., pulse width modulation (PWM)) signal having a designated duty (e.g., 33%) of a designated frequency (e.g., 38 kHz) according to a control of the processor 216, and output IR light through the light emitting element 211, based on the generated modulation signal. According to various embodiments, the light emitting element 211 may include at least one infrared light emitting diode (IR LED).

According to an embodiment, the IR receiver 214 may sense light (e.g., IR light) from the outside through a light sensing element 213, and may convert (or demodulate) an electrical IR reception signal corresponding to the sensed light into a digital IR reception packet. For example, the IR receiver 214 may obtain an IR reception signal, based on a first time interval in which IR light is sensed through the light sensing element 213, and a second time interval in which IR light is not sensed, and may demodulate the IR reception signal into an IR data packet, based on a designated IrDA-based demodulation scheme. According to an embodiment, the light sensing element 213 may include a light sensor which converts received light energy into an electrical signal. For example, the light sensor may include a photo diode.

According to an embodiment, the processor 216 may be configured to: identify a first IR transmission signal to be transmitted to an external device (e.g., the second electronic device 202); identify a first time interval and a second time interval corresponding to the first IR transmission signal; output first IR light corresponding to at least a part of the first IR transmission signal through the IR transmitter 212 in the first time interval; identify whether external light (or interference light 20) (hereinafter, also referred to as "second IR light") having an intensity of a threshold or higher is received by the IR receiver 214 in the second time interval; and if the second IR light having an intensity of the threshold or higher is received by the IR receiver 214 in the second time interval, stop transmitting the first IR transmission signal through the IR transmitter 212. According to an embodiment, the interference light 20 may be caused by a peripheral light source, and may include IR light. For example, the light caused by the peripheral light source may correspond to natural light (e.g., sunlight), light caused by a fluorescent lamp, or IR light emitted by another infrared communication device.

According to an embodiment, the memory 218 may store instructions and information associated to the instructions, the instructions causing the processor 216 to: identify a first IR transmission signal to be transmitted to the second electronic device 202; identify a first time interval and a second time interval corresponding to the first IR transmission signal; output first IR light corresponding to at least a part of the first IR transmission signal through the IR transmitter 212 in the first time interval; identify whether second IR light having an intensity of a threshold or higher is received by the IR receiver 214 in the second time interval; and if the second IR light having an intensity of the threshold or higher is received by the IR receiver 214 in the second time interval, stop transmitting the first IR transmission signal through the IR transmitter 212.

According to various embodiments, the processor 216 may identify a first time interval in which first IR light is to be output through the light emitting element 211, and a second time interval in which the first IR light is not output, based on a data packet to be transmitted to the second electronic device 202. The processor 216 may control (e.g., turn on) the light emitting element 211 to output the first IR light according to a designated first voltage (V1) during the first time interval, and may control (e.g., turn off) the light emitting element 211 not to output IR light according to a designated second voltage (V2) during the second time interval. For example, the light emitting element 211 may output the first IR light, based on a modulation (e.g., pulse width modulation (PWM)) signal having a designated duty (e.g., 33%) of a designated frequency (e.g., 38 KHz) in the state where the element has been turned on. The processor 216 may identify whether second IR light having an intensity of a threshold or higher is received by the IR receiver 214 in the second time interval in which the first IR light is not output by the light emitting element 211. According to various embodiments, the threshold may be a signal intensity threshold designated to, when received light is converted into an electrical signal by the light sensing element 213, determine the converted electrical signal as an IR light signal. For example, the designated signal intensity threshold may be specified to an intensity that is 30% or higher of that of a transmitted light signal.

According to various embodiments, when second IR light having an intensity of the threshold or higher is received by the IR receiver 214 in the second time interval, the processor 216 may control to stop the transmission, by the IR transmitter 212, of the first IR transmission signal, and may turn off the light emitting element 211. According to an embodiment, when second IR light having an intensity of the threshold or higher is received in the second time interval in which the first IR light is not output through the light emitting element 211, the processor 216 may control to stop the transmission of the first IR transmission signal, and may control the IR transmitter 212 to transmit a second IR transmission signal for notification of collision. After the transmission of the first IR transmission signal is stopped, when a designated interval time is satisfied, the processor 216 may control the IR transmitter 212 to retransmit the first IR transmission signal.

According to various embodiments, the processor 216 may identify whether external light (hereinafter, also referred to as "third IR light") having an intensity of a threshold or higher is received by the IR receiver 214 before the first IR light is output, and if the third IR light is not received, the processor may control the IR transmitter 212 and the light emitting element 211 to output the first IR light.

According to various embodiments, the second electronic device 202 may include an infrared (IR) receiver 224, a processor 226, and/or a memory 228.

According to an embodiment, the IR receiver 224 may sense light from the outside through a light sensing element 223, and may convert (or demodulate) an IR reception signal corresponding to the sensed light into an IR reception packet. For example, the IR receiver 224 may obtain an IR reception signal, based on a first time interval in which IR light is sensed through the light sensing element 223, and a second time interval in which IR light is not sensed, and may demodulate the IR reception signal into an IR data packet, based on an IrDA demodulation scheme. According to an embodiment, the light sensing element 223 may include a light sensor which converts received light energy into electrical energy. For example, the light sensor may include a photo diode.

According to an embodiment, the processor 226 may be configured to: identify a first time interval and a second time interval corresponding to a first IR transmission signal received from an external device (e.g., the first electronic device 201); receive first IR light corresponding to at least a part of the first IR transmission signal from the first electronic device 201 in the first time interval; identify whether second IR light having an intensity of a threshold or higher is received in the second time interval; and if the second IR light is received in the second time interval, stop receiving the first IR transmission signal.

According to an embodiment, the memory 228 may store instructions and information associated to the instructions, the instructions causing the processor 226 to: identify a first time interval and a second time interval corresponding to a first IR transmission signal received from an external device (e.g., the first electronic device 201); receive first IR light corresponding to at least a part of the first IR transmission signal from the first electronic device 201 in the first time interval; identify whether second IR light having an intensity of a threshold or higher is received in the second time interval; and if the second IR light is received in the second time interval, stop receiving the first IR transmission signal.

According to various embodiments, the processor 226 may identify a first time interval and a second time interval in a first IR transmission signal received from the first electronic device 201, based on a designated (or promised) modulation scheme. According to an embodiment, the processor 226 may recognize a first time interval and a second time interval in a first IR transmission signal received from the first electronic device 201, in advance. For example, the processor 226 may recognize that the second time interval exists next to the first time interval, in advance. The processor 226 may receive first IR light sensed through the light sensing element 223 in the first time interval, and may identify whether second IR light having an intensity of a threshold or higher is received through the light sensing element 223 in the second time interval. If the second IR light having an intensity of the threshold or higher is received in the second time interval although light is required not to be received in the second time interval, the processor 226 may stop receiving the first IR transmission signal. According to various embodiments, the threshold may be a signal intensity threshold designated to, when received light is converted into an electrical signal by the light sensing element 223, determine the converted electrical signal as an IR light signal. For example, the designated signal intensity threshold may be specified to an intensity that is 30% or higher of that of transmitted light.

According to various embodiments, if second IR light having an intensity of the threshold or higher is received by the IR receiver 224 in the second time interval in which light is required not to be sensed, the processor 226 may stop receiving the first IR transmission signal, and receive a second IR transmission signal for notification of collision from the first electronic device 201. According to an embodiment, after the reception of the first IR transmission signal is stopped, when a designated interval time is satisfied, the processor 226 may control the IR receiver 224 to re-receive the first IR transmission signal.

According to various embodiments, the IR transmitter 212 and the IR receiver 224 may be arranged to be able to communicate with each other within a designated distance. For example, the designated distance may be within 1 m.

Figure 3:
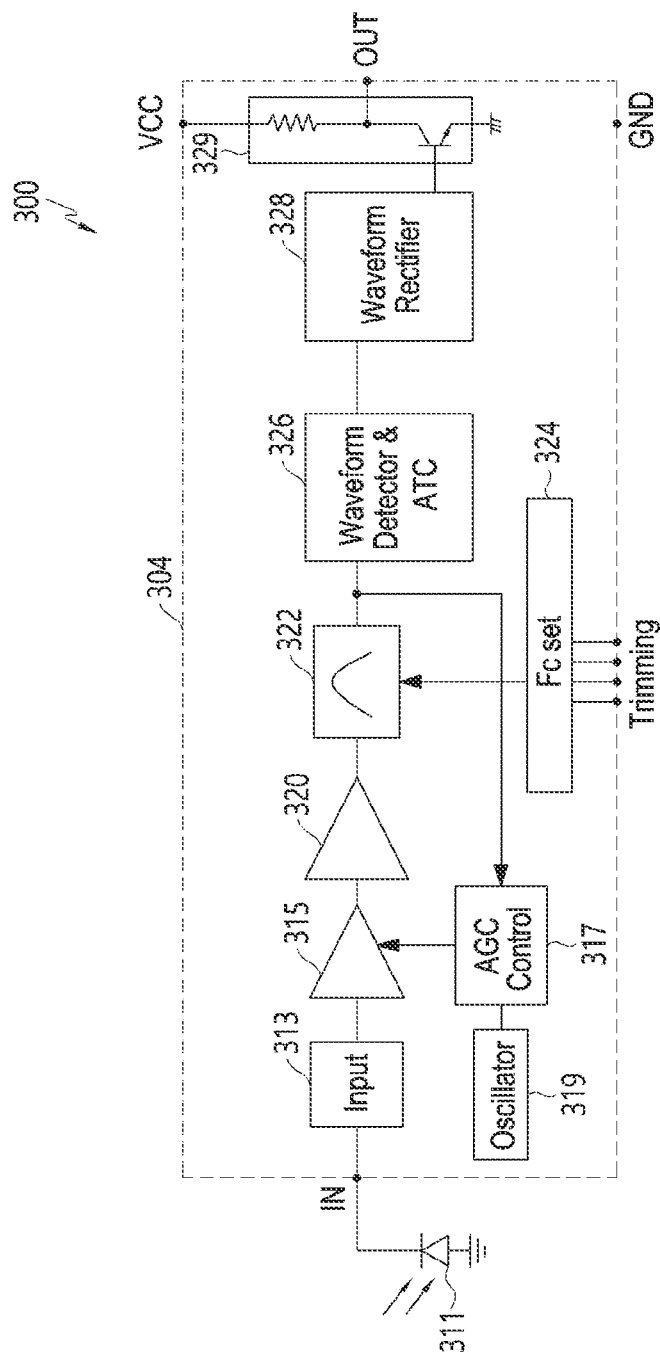
FIG. 3 is a diagram illustrating an IR receiver according to various embodiments.

FIG. 3 is a diagram 300 illustrating an IR receiver according to various embodiments.

Referring to FIG. 3, an IR receiver 304 (e.g., the communication module 190 in FIG. 1, or the IR receiver 214 or the IR receiver 224 in FIG. 2) may sense light from the outside through a light sensing element 311 (e.g., the light sensing element 213 or the light sensing element 224 in FIG. 2), and may convert (or demodulate) an IR reception signal corresponding to the sensed light into an IR reception packet.

According to various embodiments, the IR receiver 304 may include an input unit (input) 313, an automatic gain control amplifier 315, an automatic gain control controller (AGC control) 317, an oscillator 319, a rear amplifier 320, a band-pass filter 322, a pass band selector (Fc set) 324, a detector (waveform detector&ATC) 326, a rectifier (waveform rectifier) 328, and a demodulator 329.

According to an embodiment, the input unit (input) 313 may receive an electrical signal corresponding to received light energy through the light sensing element 311.

The automatic gain control amplifier 315 may control the gain of an electrical signal input to the input unit 313. The automatic gain control controller (AGC control) 317 may control the gain of the automatic gain control amplifier 315 by using a signal of the oscillator 319.

The rear amplifier 320 may amplify an electric signal having passed through the automatic gain control amplifier 315 again and output the amplified signal.

The band-pass filter 322 may pass an electrical signal having a particular pass band (e.g., an infrared frequency band) therethrough, the signal being included in a signal output from the rear amplifier 320. The pass band selector (Fc set) 324 may select, for example, a frequency of 38 kHz, as a pass band of the band-pass filter 322.

The detector (waveform detector&ATC) 326 may detect a waveform of a signal having passed through the band-pass filter 322. The rectifier (waveform rectifier) 328 may rectify a waveform detected through the detector and output a rectified electrical signal.

The demodulator 329 may demodulate a rectified electrical signal into a digital signal. According to an embodiment, the demodulator may output a modulated signal according to a scheme of outputting the signal to an output node (OUT) if a rectified electrical signal has a value of a threshold or higher, and not outputting the signal to the output node (OUT) if a rectified electrical signal has a value of a threshold or lower. According to various embodiments, the threshold may be a signal intensity threshold designated to, when received light is converted into an electrical signal by the light sensing element 311, determine the converted electrical signal as an IR light signal. For example, the designated signal intensity threshold may be specified to an intensity that is 30% or higher of that of a transmitted light signal.

Figure 4:
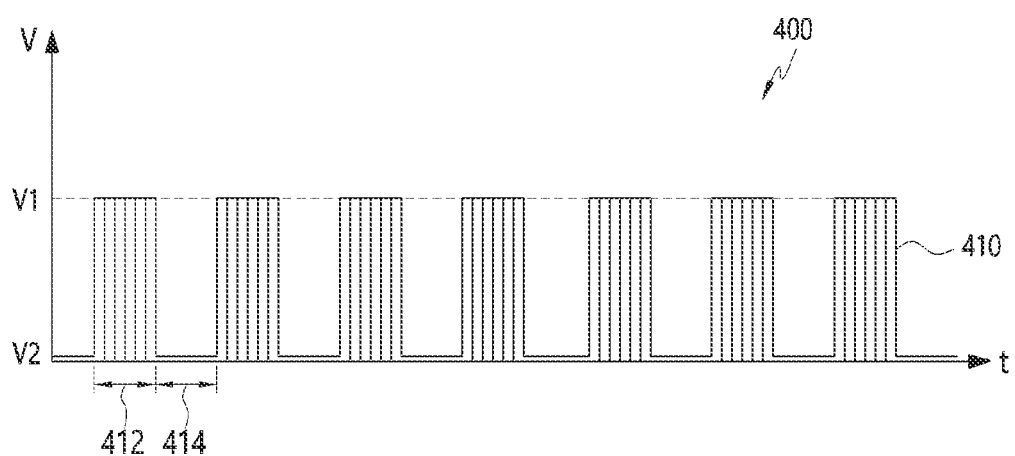
FIG. 4 is a diagram illustrating an example of an IR signal waveform generated by an IR transmitter according to various embodiments.

FIG. 4 is a diagram 400 illustrating an example of an IR signal waveform generated by an IR transmitter according to various embodiments.

Referring to FIG. 4, the horizontal axis may represent time (t), and the vertical axis may represent voltage (v). An IR transmitter (e.g., the communication module 190 in FIG. 1, or the IR transmitter 212 in FIG. 2) may generate a modulation (e.g., pulse width modulation (PWM)) signal 410 having a designated duty (e.g., 33%) of a designated frequency (e.g., 38 KHz).

According to various embodiments, pulse width modulation may adjust the size of a width, and the modulation signal 410 may have a first voltage in a first time interval 412 and a second voltage in a second time interval 414. In the first time interval 412, a light emitting element (e.g., the light emitting element 211 in FIG. 2) may be controlled by the first voltage (V1) (e.g., a "high voltage" or "High"), so that first IR light is output. In the second time interval 414, the light emitting element 211 may be controlled by the second voltage (V2) (e.g., a "low voltage" or "Low"), so that the first IR light is not output.

According to various embodiments, an IR transmitter (e.g., the communication module 190 in FIG. 1, or the IR transmitter 212 in FIG. 2) may output a signal corresponding to an IR packet in a modulation scheme having one format among various formats by using the length of each of the first time interval 412 and the second time interval 414, and/or a combination of the first time interval 412 and the second time interval 414.

FIG. 5 is a diagram 500 illustrating an example of a format of an IR signal according to various embodiments.

Referring to FIG. 5, a format of an IR signal may include the part of lead 510, the part of bit 0 520, the part of bit 1 530, and the part of end 540. The part of lead 510 may represent an IR signal transmission start. For example, the part of lead 510 may include one of Preamble, STX, or STA. The part of bit 0 520 may indicate that a bit value is 0. The part of bit 1 530 may indicate that a bit value is 1. The part of end 540 may represent an IR signal transmission end.

According to various embodiments, the format of an IR signal may be one of various formats including a first format (e.g., NEC) to an eighth format (e.g., TC9012), and any other formats may be possible For example, the first format (e.g., NEC) may notify of an IR signal transmission start by outputting first IR light corresponding to High during a first time interval of 9 ms in the part of lead 510, and not outputting IR light correspondingly to Low during a second time interval of 4.5 ms. The first format may: transmit a bit value of 0 by outputting the first IR light corresponding to High during a first time interval of 0.562 ms in the part of bit 0 520, and not outputting IR light correspondingly to Low during a second time interval of 0.562 ms; transmit a bit value of 1 by outputting the first IR light corresponding to High during a first time interval of 0.562 ms in the part of bit 1 530, and not outputting IR light correspondingly to Low during a second time interval of 1.675 ms; and notify of an IR signal transmission end by outputting the first IR light corresponding to High during a first time interval of 0.562 ms in the part of end 540.

For example, the eighth format (TC9012) may notify of an IR signal transmission start by outputting first IR light corresponding to High during a first time interval of 4.5 ms in the part of lead 510, and not outputting IR light correspondingly to Low during a second time interval of 4.5 ms. The eighth format may: transmit a bit value of 0 by outputting the first IR light corresponding to High during a first time interval of 0.56 ms in the part of bit 0 520, and not outputting IR light correspondingly to Low during a second time interval of 0.56 ms; transmit a bit value of 1 by outputting the first IR light corresponding to High during a first time interval of 0.56 ms in the part of bit 1 530, and not outputting IR light correspondingly to Low during a second time interval of 1.68 ms; and notify of an IR signal transmission end by outputting the first IR light corresponding to High during a first time interval of 0.56 ms in the part of end 540. According to various embodiments, second to seventh formats may also notify of an IR transmission start, transmit a bit value, or notify of an IR transmission end according to a scheme similar to those of the first and eighth formats.

Figure 6:
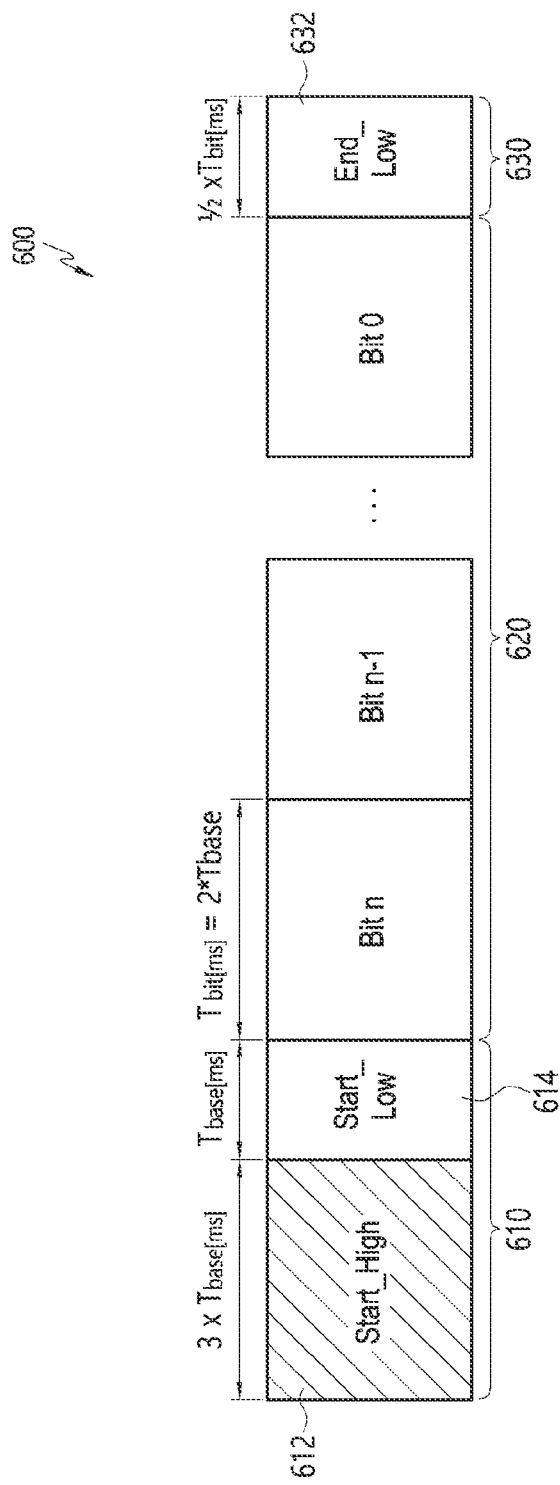
FIG. 6 is a diagram illustrating an example of an IR data packet according to various embodiments.

FIG. 6 is a diagram 600 illustrating an example of an IR data packet according to various embodiments;

Referring to FIG. 6, an IR data packet according to various embodiments may include a part 610 (e.g., Lead 510 in FIG. 5) indicating an IR signal transmission start, a part (Bit 0 to Bit n) 620 of data to be transmitted, and/or a part 630 (e.g., End 540 in FIG. 5) indicating an IR signal transmission end.

For example, an IR transmitter (e.g., the communication module 190 in FIG. 1, or the IR transmitter 212 in FIG. 2) may modulate the part 610 indicating an IR signal transmission start into an IR light signal having High 612 during a first time interval of 3*Tbase (ms) and having Low 614 during a second time interval of Tbase (ms), and output the signal. In addition, the IR transmitter (e.g., the communication module 190 in FIG. 1, or the IR transmitter 212 in FIG. 2) may modulate the part 620 indicating bits into an IR light signal having Low (or High) during the first time interval and having High (or Low) during the second time interval per bit, and output the signal. In addition, the IR transmitter (e.g., the communication module 190 in FIG. 1, or the IR transmitter 212 in FIG. 2) may modulate the part 630 indicating an IR signal transmission end into an IR light signal having Low 632 during the second time interval of (½)*Tbit (ms), and output the signal.

Figure 7:
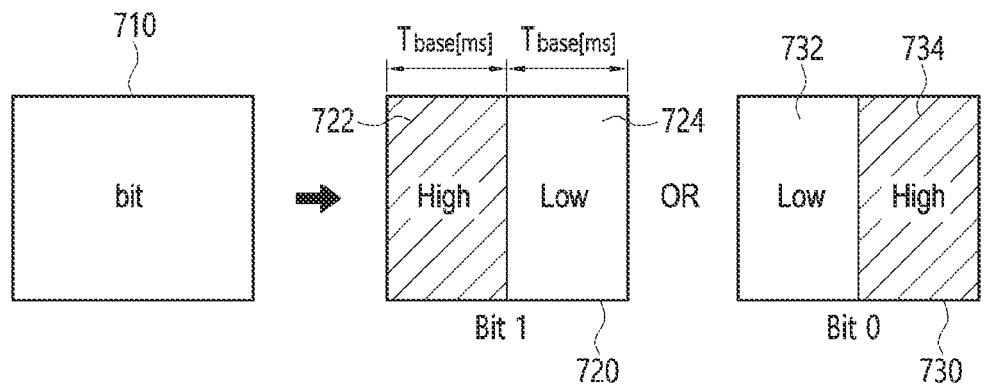
FIGS. 7 and 8 are diagrams illustrating an example of modulation of one bit according to various embodiments.
Figure 8:
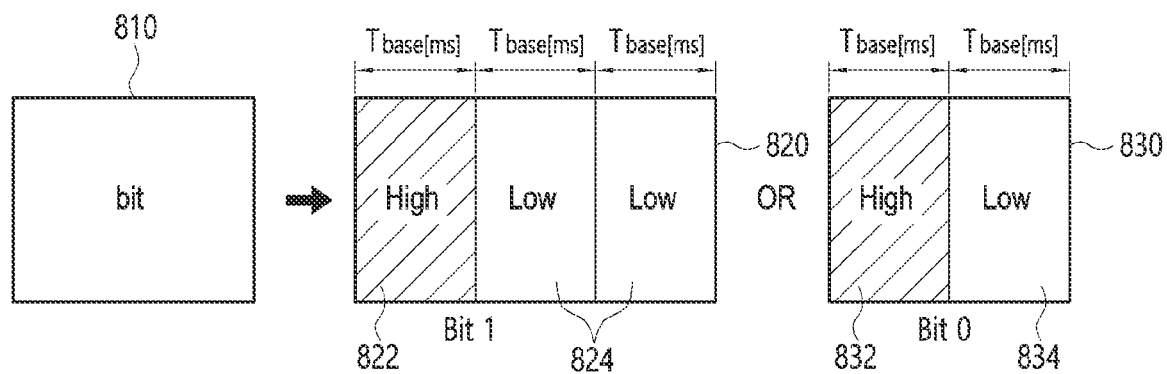

FIGS. 7 and 8 are diagrams 700 and 800 illustrating an example of modulation of one bit according to various embodiments.

Referring to FIG. 7, an IR transmitter (e.g., the communication module 190 in FIG. 1, or the IR transmitter 212 in FIG. 2) according to various embodiments may modulate one bit 710 by using an order of a first time interval and a second time interval.

For example, the IR transmitter (e.g., the communication module 190 in FIG. 1, or the IR transmitter 212 in FIG. 2) may modulate Bit 1 720 having a bit value of 1 with respect to the one bit 710 into an IR light signal having High 722 during a first time interval of Tbase (ms) and having Low 724 during a second time interval of Tbase (ms), and output the signal. In addition, the IR transmitter (e.g., the communication module 190 in FIG. 1, or the IR transmitter 212 in FIG. 2) may modulate Bit 0 730 having a bit value of 0 with respect to the one bit 710 into an IR light signal having Low 732 during a first time interval of Tbase (ms) and having High 734 during a second time interval of Tbase (ms), and output the signal.

Referring to FIG. 8, an IR transmitter (e.g., the communication module 190 in FIG. 1, or the IR transmitter 212 in FIG. 2) according to various embodiments may modulate one bit 810 by using the lengths of a first time interval and a second time interval.

For example, the IR transmitter (e.g., the communication module 190 in FIG. 1, or the IR transmitter 212 in FIG. 2) may modulate Bit 1 820 having a bit value of 1 with respect to the one bit 810 into an IR light signal having High 822 during a first time interval of Tbase (ms) and having Low 824 during a second time interval of 2Tbase (ms), and output the signal. In addition, the IR transmitter (e.g., the communication module 190 in FIG. 1, or the IR transmitter 212 in FIG. 2) may modulate Bit 0 830 having a bit value of 0 with respect to the one bit 810 into an IR light signal having High 832 during a first time interval of Tbase (ms) and having Low 834 during a second time interval of Tbase (ms), and output the signal.

Figure 9:
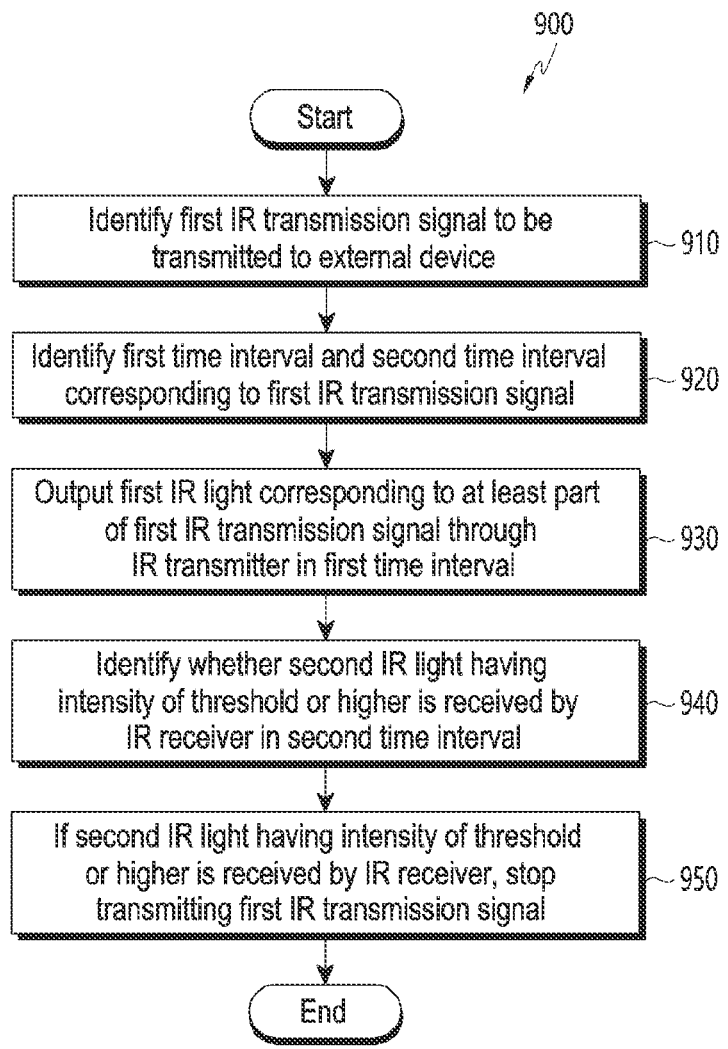
FIG. 9 is a flowchart illustrating an operation of transmitting an IR signal, based on interference detection by an electronic device according to various embodiments.

FIG. 9 is a flowchart 900 illustrating an operation of transmitting an IR signal, based on interference detection by an electronic device according to various embodiments.

Operations 910 to 950 according to various embodiments may be understood as operations performed by a processor (e.g., the processor 120 in FIG. 1, or the processor 216 in FIG. 2, hereinafter, the following description will be given with the processor 216 in FIG. 2, for example) of an electronic device (e.g., the electronic device 101 in FIG. 1 or the electronic device 201 in FIG. 2). According to an embodiment, at least one of operations 910 to 950 may be omitted, the order of some operations may be changed, or another operation may be added.

According to various embodiments, in operation 910, the processor 216 may identify a first IR transmission signal to be transmitted to an external device (e.g., the second electronic device 202). According to one embodiment, the processor 216 may identify a first IR transmission signal modulated based on an IR data packet to be transmitted to an external device (e.g., the second electronic device 202). According to an embodiment, the IR data packet may include a part (e.g., Lead 510 in FIG. 5 or the part 610 in FIG. 6) indicating an IR signal transmission start, a part (e.g., Bit 0 to Bit n 620 in FIG. 6) of data to be transmitted, and/or a part (e.g., End 540 in FIG. 5 or the part 630 in FIG. 6) indicating an IR signal transmission end.

In operation 920, the processor 216 according to an embodiment may identify a first time interval and a second time interval corresponding to the first IR transmission signal. According to an embodiment, the processor 216 may identify a first time interval corresponding to High and a second time interval corresponding to Low in each of a part (e.g., Lead 510 in FIG. 5 or the part 610 in FIG. 6) indicating an IR signal transmission start, a part (e.g., Bit 0 to Bit n 620 in FIG. 6) of data to be transmitted, and/or a part (e.g., End 540 in FIG. 5 or the part 630 in FIG. 6) indicating an IR signal transmission end.

In operation 930, the processor 216 according to an embodiment may output first IR light corresponding to at least a part of the first IR transmission signal through the IR transmitter 212 in the first time interval. For example, the processor 216 may control (e.g., turn on) a light emitting element (e.g., the light emitting element 211 in FIG. 2) to output the first IR light according to a designated first voltage (V1) during the first time interval, and may control (e.g., turn off) the light emitting element 211 not to output IR light according to a designated second voltage (V2) during the second time interval. The light emitting element 211 may output the first IR light, based on a modulation (e.g., pulse width modulation (PWM)) signal having a designated duty (e.g., 33%) of a designated frequency (e.g., 38 kHz) in the state where the element has been turned on. According to various embodiments, the processor 216 may identify whether external light (hereinafter, also referred to as "third IR light") having an intensity of a threshold or higher is received by the IR receiver 214 before the first IR light is output, and if the third IR light is not received, the processor may control the IR transmitter 212 and the light emitting element 211 to output the first IR light.

In operation 940, the processor 216 according to an embodiment may identify whether external light (e.g., the interference light 20 or the second IR light in FIG. 2) having an intensity of a threshold or higher is received by an IR receiver (e.g., the IR receiver 214 in FIG. 2) in the second time interval. According to an embodiment, the threshold may be a signal intensity threshold designated to, when received light is converted into an electrical signal by the light sensing element 213, determine the converted electrical signal as an IR light signal. For example, the designated signal intensity threshold may be specified to an intensity that is 30% or higher of that of a transmitted light signal.

In operation 950, the processor 216 according to an embodiment may be configured to, when the second IR light having an intensity of the threshold or higher is received by the IR receiver 214 in the second time interval, stop transmitting the first IR transmission signal through the IR transmitter 212. According to various embodiments, when the second IR light having an intensity of the threshold or higher is received by the IR receiver 214 in the second time interval, the processor 216 may identify that interference has been detected, may control to stop the transmission, by the IR transmitter 212, of the first IR transmission signal, and may turn off the light emitting element 211. According to an embodiment, when the second IR light having an intensity of the threshold or higher is received in the second time interval in which the first IR light is not output through the light emitting element 211, the processor 216 may control to stop the transmission of the first IR transmission signal, and may control the IR transmitter 212 to transmit a second IR transmission signal for notification of collision. After the transmission of the first IR transmission signal is stopped, when a designated interval time is satisfied, the processor 216 may control the IR transmitter 212 to retransmit the first IR transmission signal.

Figure 10:
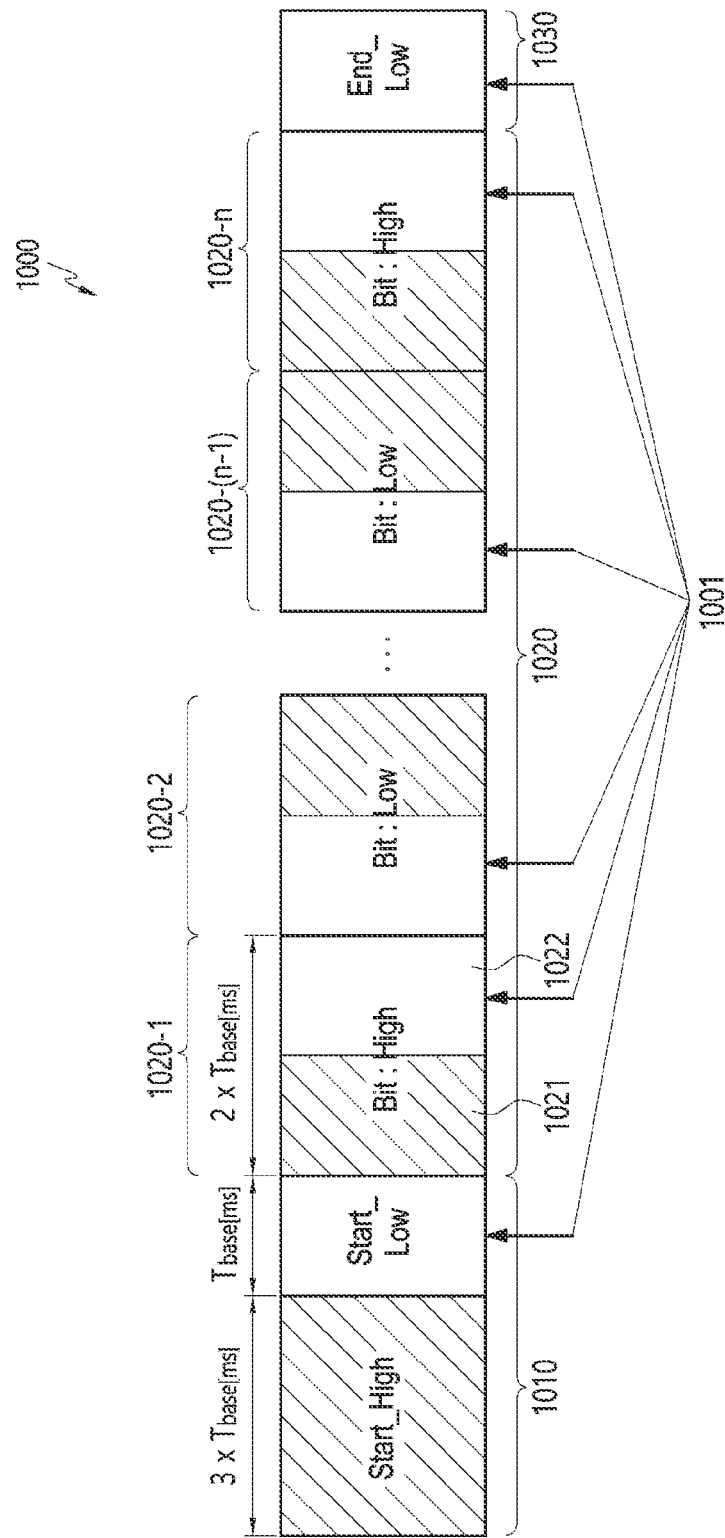
FIG. 10 is a diagram illustrating an example of a second time interval in which second IR light is sensed at the time of transmission of an IR data packet according to various embodiments.

FIG. 10 is a diagram illustrating an example of a second time interval in which second IR light is sensed at the time of transmission of an IR data packet according to various embodiments.

Referring to FIG. 10, an IR data packet 1000 according to various embodiments may include a part 1010 (e.g., Lead 510 in FIG. 5 or the part 610 in FIG. 6) indicating an IR signal transmission start, a part 1020 (e.g., Bit 0 to Bit n 620 in FIG. 6) of data to be transmitted, and/or a part 1030 (e.g., End 540 in FIG. 5 or the part 630 in FIG. 6) indicating an IR signal transmission end. The part 1010 indicating an IR signal transmission start may include a first time interval corresponding to Start_High, and a second time interval corresponding to Start_Low. The part 1020 of data to be transmitted may include n bits 1020-1 to 1020-n, and each of the bits may include a first time interval corresponding to High, and a second time interval corresponding to Low. The part 1030 indicating an IR signal transmission end may include a second time interval corresponding to End_Low.

According to various embodiments, the first time intervals corresponding to High may be intervals in which first IR light is output through a light emitting element (e.g., the light emitting element 211 in FIG. 2), and the second time intervals 1001 corresponding to Low may be intervals in which the first IR light is not output through the light emitting element (e.g., the light emitting element 211 in FIG. 2). For example, an IR receiver (e.g., the communication module 190 in FIG. 1, or the IR receiver 214 in FIG. 2) may perform a sensing operation in each of the second time intervals 1001 corresponding to Low. If IR light (e.g., second IR light) having an intensity of a threshold or higher is received in each of the second time intervals 1001, it may be identified that interference affecting the transmitted first IR light has been detected.

According to an embodiment, a processor (e.g., the processor 120 in FIG. 1 or the processor 216 in FIG. 2) may output a first IR light signal during the first time interval corresponding to Start_High and having 3*Tbase (ms) through an IR transmitter (e.g., the communication module 190 in FIG. 1, or the IR transmitter 212 in FIG. 2) and the light emitting element 211, and then may perform a light sensing operation through the IR receiver (e.g., the communication module 190 in FIG. 1, or the IR receiver 214 in FIG. 2) and a light sensing element 213 during the second time interval corresponding to Start_Low and having Tbase (ms), in which an IR light signal is not output. If IR light (e.g., second IR light) having an intensity of a threshold or higher is received during the second time interval corresponding to Start_Low, the processor (e.g., the processor 120 in FIG. 1 or the processor 216 in FIG. 2) may identify that interference affecting the transmitted first IR light exists, and then stop transmitting the IR data packet 1000.

According to an embodiment, the processor (e.g., the processor 120 in FIG. 1 or the processor 216 in FIG. 2) may transmit the part 1010 indicating an IR signal transmission start, and then sequentially transmit the n bits 1020-1 to 1020-n as the part 1020 of data to be transmitted. In order to transmit the first bit 1020-1 of the data part 1020, the processor (e.g., the processor 120 in FIG. 1 or the processor 216 in FIG. 2) may output an IR light signal during the first time interval 1021 corresponding to High and having Tbase (ms) through the IR transmitter (e.g., the communication module 190 in FIG. 1, or the IR transmitter 212 in FIG. 2) and the light emitting element 211, and then may not output an IR light signal during the second time interval 1022 corresponding to Low and having Tbase (ms). The processor (e.g., the processor 120 in FIG. 1 or the processor 216 in FIG. 2) may perform a light sensing operation through the IR receiver (e.g., the communication module 190 in FIG. 1, or the IR receiver 214 in FIG. 2) and the light sensing element 213 during the second time interval 1022 corresponding to Low. If IR light (e.g., second IR light) having an intensity of a threshold or higher is received during the second time interval 1022 corresponding to Low, the processor (e.g., the processor 120 in FIG. 1 or the processor 216 in FIG. 2) may identify that interference affecting the transmitted first IR light has been detected, and then stop transmitting the IR data packet 1000.

Figure 11:
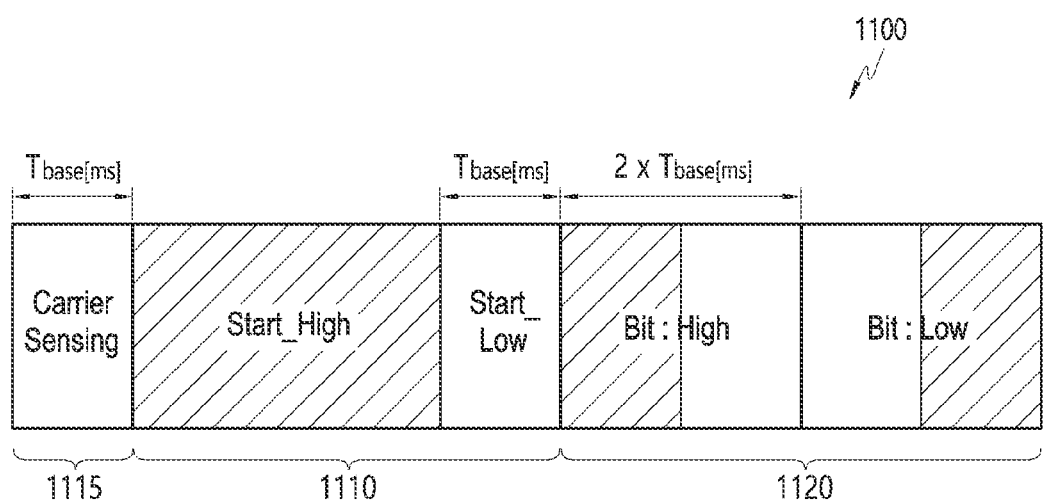
FIG. 11 is a diagram illustrating an example of a second time interval for sensing second IR light before transmission of an IR data packet according to various embodiments.

FIG. 11 is a diagram illustrating an example of a second time interval for sensing second IR light before transmission of an IR data packet according to various embodiments.

Referring to FIG. 11, an IR data packet 1100 according to various embodiments may include a part 1110 (e.g., Lead 510 in FIG. 5, the part 610 in FIG. 6, or the part 1010 in FIG.

10) indicating an IR signal transmission start, and a part 1120 (e.g., Bit 0 520 and Bit 1 530 in FIG. 5, the part 620 in FIG. 6, or the part 1020 in FIG. 10) of data to be transmitted. The IR data packet 1100 according to various embodiments may further include the part of Carrier sensing 1115, which is disposed to sense external light (e.g., third IR light), in front of the part 1110 indicating an IR signal transmission start According to various embodiments, a processor (e.g., the processor 120 in FIG. 1 or the processor 216 in FIG. 2) may perform a light sensing operation through an IR receiver (e.g., the communication module 190 in FIG. 1, or the IR receiver 214 in FIG. 2) and the light sensing element 213 during a second time interval 1022 corresponding to Carrier sensing 1115 before first IR light is output. If external light (e.g., the third IR light) having an intensity of a threshold or higher is not received before the first IR light is output, the processor 216 may control an IR transmitter (e.g., the communication module 190 in FIG. 1, or the IR transmitter 212 in FIG. 2) and a light emitting element (e.g., the light emitting element 211 in FIG. 2) to output the first IR light.

Figure 12:
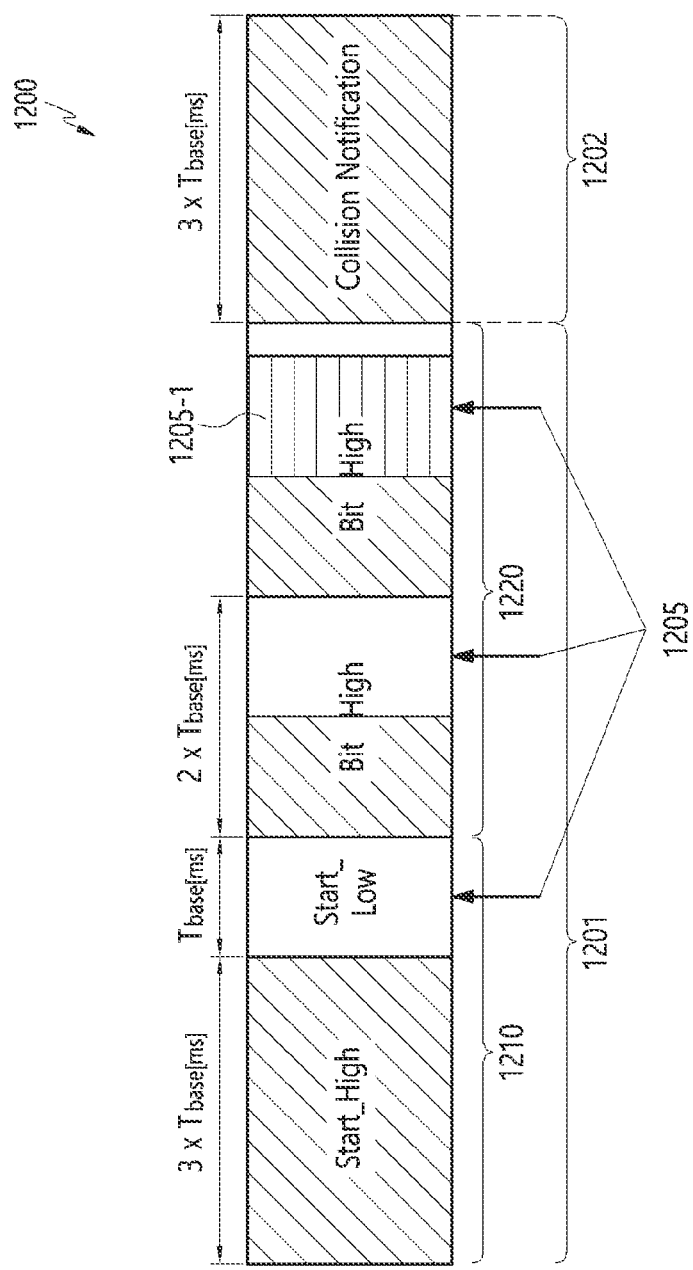
FIG. 12 is a diagram illustrating an example of notification of collision when interference is detected during transmission of an IR data packet according to various embodiments.

FIG. 12 is a diagram 1200 illustrating an example of notification of collision when interference is detected during transmission of an IR data packet according to various embodiments.

Referring to FIG. 12, a processor (e.g., the processor 120 in FIG. 1 or the processor 216 in FIG. 2) according to various embodiments may identify whether second IR light having an intensity of a threshold or higher is received in each of second time intervals 1205, while transmitting a first IR data packet 1201. In a case where second IR light having an intensity of a threshold or higher is received in one second time interval 1205-1 among the second time intervals 1205, the processor 216 may control an IR transmitter (e.g., the communication module 190 in FIG. 1, or the IR transmitter 212 in FIG. 2) and a light emitting element (e.g., the light emitting element 211 in FIG. 2) to control to stop transmitting a first IR transmission signal and transmit a second IR transmission signal 1202 for notification of collision.

According to various embodiments, the processor (e.g., the processor 120 in FIG. 1 or the processor 216 in FIG. 2) may transmit the second IR transmission signal 1202 for notification of collision, the signal including time intervals, the lengths of which are distinguishable from those of the time intervals of a part 1210 (e.g., Lead 510 in FIG. 5 or the part 610 in FIG. 6) indicating an IR signal transmission start, a part 1220 (e.g., Bit 0 to Bit n 620 in FIG. 6) of data to be transmitted, and a part (e.g., End 540 in FIG. 5 or the part 630 in FIG. 6) indicating an IR signal transmission end, respectively. For example, the second IR transmission signal 1202 for notification of collision may have a longer time length than the length (e.g., 3*Tbase) of the part (e.g., Lead 510 in FIG. 5 or the part 610 in FIG. 6) indicating an IR signal transmission start.

Figure 13:
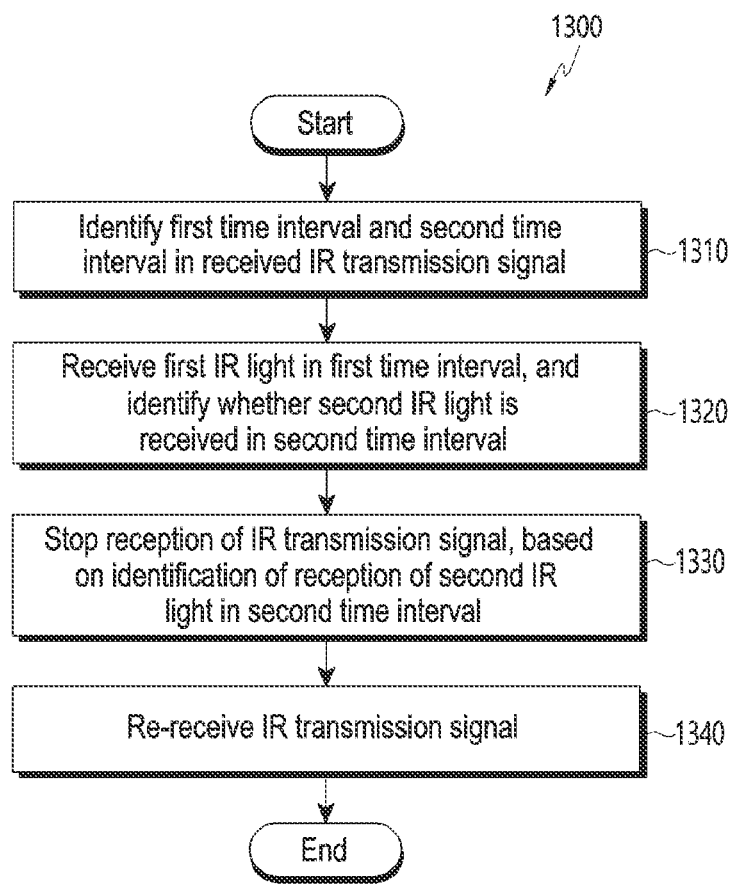
FIG. 13 is a flowchart illustrating an operation of receiving an IR signal, based on interference detection by an electronic device according to various embodiments.

FIG. 13 is a flowchart 1300 illustrating an operation of receiving an IR signal, based on interference detection by an electronic device according to various embodiments.

Operations 1310 to 1340 according to various embodiments may be understood as operations performed by a processor (e.g., the processor 120 in FIG. 1, or the processor 226 in FIG. 2, hereinafter, the following description will be given with the processor 226 in FIG. 2, for example) of an electronic device (e.g., the electronic device 101 in FIG. 1 or the electronic device 202 in FIG. 2). According to an embodiment, at least one of operations 1310 to 1340 may be omitted, the order of some operations may be changed, or another operation may be added.

In operation 1310, a processor 226 according to an embodiment may identify a first time interval and a second time interval in an IR signal (e.g., a first IR transmission signal) received from an external device (e.g., the first electronic device 201), based on a designated (or promised) modulation scheme. According to an embodiment, the processor 226 may recognize a first time interval and a second time interval in a first IR transmission signal received from the first electronic device 201, in advance. For example, the processor 226 may recognize that the second time interval exists next to the first time interval, in advance.

In operation 1320, the processor 226 according to an embodiment may receive first IR light sensed through the light sensing element 223 in the first time interval, and may identify whether second IR light having an intensity of a threshold or higher is received through the light sensing element 223 in the second time interval.

In operation 1330, the processor 226 according to an embodiment may stop the reception of an IR signal, based on the identification of the reception of IR light in the second time interval. According to an embodiment, if the second IR light having an intensity of the threshold or higher is received in the second time interval although light is required not to be received in the second time interval, the processor 226 may stop receiving the first IR transmission signal. According to various embodiments, the threshold may be a signal intensity threshold designated to, when received light is converted into an electrical signal by the light sensing element 223, determine the converted electrical signal as an IR light signal. For example, the designated signal intensity threshold may be specified to an intensity that is 20% or higher of that of transmitted light, or 30% or higher thereof.

In operation 1340, the processor 226 according to an embodiment may re-receive an IR signal. According to an embodiment, the processor 226 may stop receiving the first IR transmission signal, and then receive a second IR transmission signal for notification of collision from the first electronic device 201. According to an embodiment, after the reception of the first IR transmission signal is stopped, when a designated interval time is satisfied, the processor 226 may control the IR receiver 224 to re-receive the first IR transmission signal. According to an embodiment, after the reception of the first IR transmission signal is stopped, when the second IR transmission signal for notification of collision is received, and then a designated interval time is satisfied, the processor 226 may control the IR receiver 224 to re-receive the first IR transmission signal.

Figure 14:
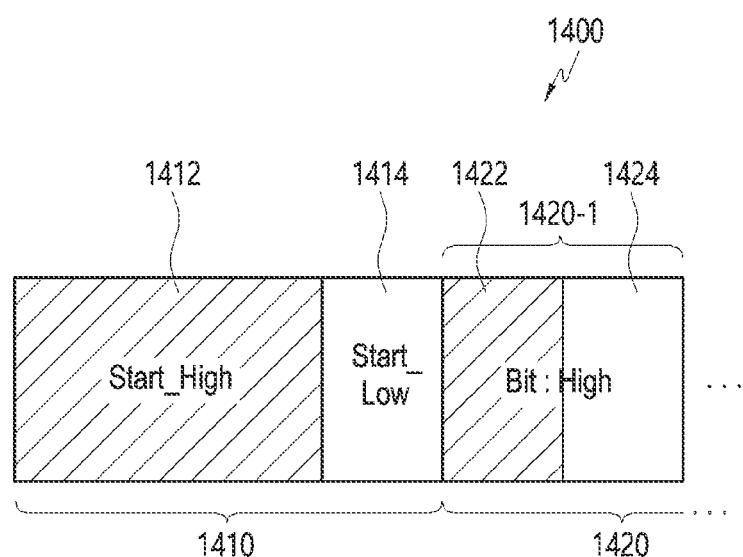
FIG. 14 is a diagram illustrating an example of a second time interval in which second IR light is sensed at the time of reception of an IR data packet according to various embodiments.

FIG. 14 is a diagram 1400 illustrating an example of a second time interval in which second IR light is sensed in a case of reception of an IR data packet according to various embodiments.

Referring to FIG. 14, a processor (e.g., the processor 120 in FIG. 1 or the processor 226 in FIG. 2) may receive a signal of Start_High 1412 notifying of an IR signal transmission start during a first time interval from the outside through an IR receiver (e.g., the communication module 190 in FIG. 1, or the IR receiver 224) and a light sensing element (e.g., the light sensing element 213 or the light sensing element 224 in FIG. 2). After the signal of Start_High 1412 is received, the processor (e.g., the processor 120 in FIG. 1 or the processor 226 in FIG. 2) may identify that a second time interval corresponding to Start_Low 1414 exists, and may identify whether second IR light having an intensity of a threshold or higher is received through the IR receiver (e.g., the communication module 190 in FIG. 1, or the IR receiver 224) and the light sensing element (e.g., the light sensing element 213 or the light sensing element 224 in FIG. 2) in the second time interval. If the second IR light is received in the second time interval corresponding to Start_Low 1414, the processor (e.g., the processor 120 in FIG. 1 or the processor 226 in FIG. 2) may stop an IR signal reception operation. If the second IR light is not received in the second time interval corresponding to Start_Low 1414, the processor (e.g., the processor 120 in FIG. 1 or the processor 226 in FIG. 2) may receive a first bit 1420-1 included in a data part 1420. After a signal of High 1422 of the first bit 1420-1 is received during a first interval, the processor (e.g., the processor 120 in FIG. 1 or the processor 226 in FIG. 2) may identify that a signal of Low 1424 is required to be received in a second time interval, and may identify whether second IR light having an intensity of a threshold or higher is received through the IR receiver (e.g., the communication module 190 in FIG. 1, or the IR receiver 224) and the light sensing element (e.g., the light sensing element 213 or the light sensing element 224 in FIG. 2) in the second time interval corresponding to Low 1424. If the second IR light is received in the second time interval corresponding to Low 1424, the processor (e.g., the processor 120 in FIG. 1 or the processor 226 in FIG. 2) may stop an IR signal reception operation. If the second IR light is not received in the second time interval corresponding to Low 1424, the processor (e.g., the processor 120 in FIG. 1 or the processor 226 in FIG. 2) may receive the bit next to the first bit 1420-1. According to this scheme, the processor (e.g., the processor 120 in FIG. 1 or the processor 226 in FIG. 2) may identify whether the second IR light having an intensity of the threshold or higher is received in each of the second time intervals included in the IR data packet, and if the second IR light having an intensity of the threshold or higher is received in one second time interval, the processor may stop an IR signal reception operation.

Figure 15:
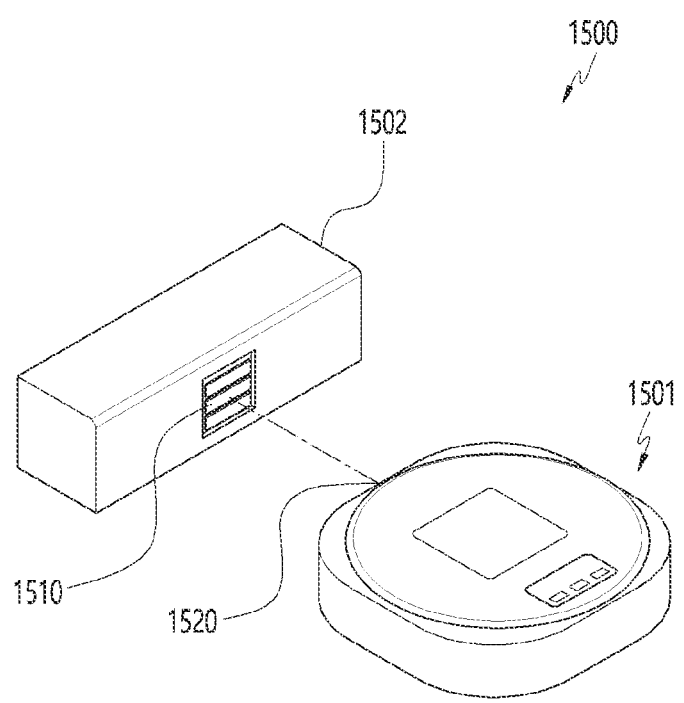
FIG. 15 is a diagram illustrating an example in which a first electronic device and a second electronic device correspond to a robot cleaner and a charging device, respectively, according to various embodiments.

FIG. 15 is a diagram 1500 illustrating an example in which a first electronic device and a second electronic device correspond to a robot cleaner and a charging device, respectively, according to various embodiments.

Referring to FIG. 15, a robot cleaner 1501 (e.g., the electronic device 101 in FIG. 1, or the electronic device 201 in FIG. 2) and a charging device 1502 (e.g., the electronic device 101 in FIG. 1, or the electronic device 202 in FIG. 2) according to various embodiments may be devices supporting an infrared communication protocol. According to an embodiment, the infrared communication protocol may include a communication protocol based on an infrared data association (IrDA) standard. The robot cleaner 1501 may identify a docking part 1510 of the charging device 1502 by using a sensor 1520, dock with the charging device 1502 through the docking part 1510, and then perform infrared communication to receive power from the charging device 1502.

Figure 16:
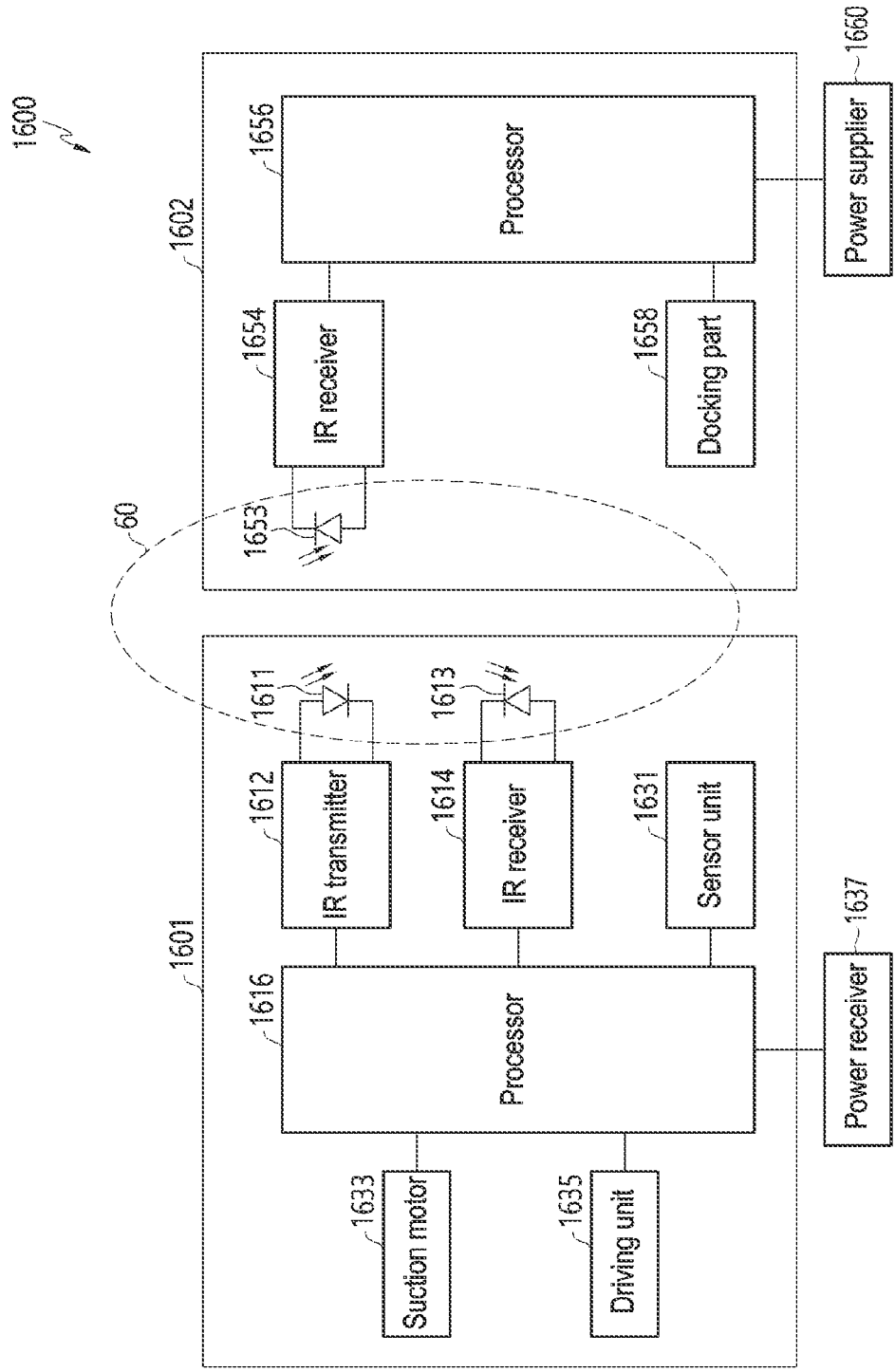
FIG. 16 is a block diagram of a robot cleaner and a charging device according to various embodiments.

FIG. 16 is a block diagram 1600 of a robot cleaner and a charging device according to various embodiments.

Referring to FIG. 16, a robot cleaner 1601 according to an embodiment may include the entirety or a part of the electronic device 101 in FIG. 1, the electronic device 201 in FIG. 2, or the robot cleaner 1501 in FIG. 15. A charging device 1602 according to an embodiment may include the entirety or a part of the electronic device 101 in FIG. 1, the electronic device 202 in FIG. 2, or the charging device 1601 in FIG. 15.

According to various embodiments, the robot cleaner 1601 may include an infrared (IR) transmitter 1612, an infrared (IR) receiver 1614, a processor 1616, a sensor unit 1631, a suction motor 1633, a driving unit 1635, and/or a power receiver 1637.

According to an embodiment, the IR transmitter 1612 may convert (modulate) a data packet to be transmitted, into an IR transmission signal (hereinafter, also referred to as a "first IR transmission signal"), and may output IR light (hereinafter, also referred to as "first IR light") corresponding to the modulated IR transmission signal through a light emitting element 1611. According to various embodiments, the IR transmitter 1612 may transmit a first IR transmission signal corresponding to an IR data packet to be transmitted, based on a designated IrDA-based modulation scheme. According to an embodiment, the IR transmitter 1612 may transmit a first transmission signal by a scheme of outputting first IR light through the light emitting element 1611 according to a designated first voltage (V1) (hereinafter, also referred to as a "high voltage" or "High") in a first time interval, based on a logical value (e.g., "1" or "0") of a bit included in a data packet, or not outputting light according to a designated second voltage (V2) (hereinafter, also referred to as a "low voltage" or "Low") in a second time interval. For example, the IR transmitter 1612 may generate a modulation (e.g., pulse width modulation (PWM)) signal having a designated duty (e.g., 33%) of a designated frequency (e.g., 38 kHz) according to a control of the processor 1616, and output IR light through the light emitting element 1611, based on the generated modulation signal. According to various embodiments, the light emitting element 1611 may include at least one infrared light emitting diode (IR LED).

According to an embodiment, the IR receiver 1614 may sense light (e.g., IR light) from the outside through a light sensing element 1613, and may convert (or demodulate) an electrical IR reception signal corresponding to the sensed light into a digital IR reception packet. For example, the IR receiver 1614 may obtain an IR reception signal, based on a first time interval in which IR light is sensed through the light sensing element 1613, and a second time interval in which IR light is not sensed, and may demodulate the IR reception signal into an IR data packet, based on a designated IrDA-based demodulation scheme. According to an embodiment, the light sensing element 1613 may include a light sensor which converts received light energy into an electrical signal. For example, the light sensor may include a photo diode.

According to an embodiment, the sensor unit 1631 may include at least one sensor which can sense the situations around the robot cleaner, so that the robot cleaner 1601 performs automatic cleaning. For example, the sensor unit 1631 may perform sensing to identify the running state of the robot cleaner 1601, or may perform sensing to dock with a docking part 1658 of the charging device 1602.

According to an embodiment, the suction motor 1633 may include a motor for suctioning foreign materials. According to an embodiment, the driving unit 1635 may move the robot cleaner 1601, include a driving motor or a driving wheel, and move the robot cleaner 1601 through the driving motor or the driving wheel.

According to an embodiment, the power receiver 1637 may receive power provided from the charging device 1602.

According to various embodiments, the processor 1616 may identify whether the robot cleaner 1601 has been docked through the docking part 1658 of the charging device 1602, through the sensor unit 1631. The processor 1616 may transmit or receive an IR data packet associated with charging to or from the charging device 1602, based on an infrared communication protocol in the state where the robot cleaner 1601 has docked with the charging device 1602.

According to an embodiment, the processor 1616 may control the power receiver 1637 to receive power wiredly or wirelessly transmitted from the charging device 1602 as the robot cleaner 1601 is docked with the docking part 1658 of the charging device 1602.

According to an embodiment, when power is received from the charging device 1602, the processor 1616 may generate a first IR data packet including the intensity of the received power, and may identify a first time interval and a second time interval of a first IR transmission signal corresponding to the first IR data packet.

According to an embodiment, the processor 1616 may identify, based on a logical value (e.g., "1" or "0") of a bit included in a data packet, a first time interval in which a designated first voltage (V1) (hereinafter, also referred to as a "high voltage" or "High") is required to be output, and a second time interval in which a designated second voltage (V2) (hereinafter, also referred to as a "low voltage" or "Low") is required to be output.

According to an embodiment, the processor 1616 may output first IR light corresponding to at least a part of the first IR transmission signal through the IR transmitter 1612 in the first time interval, and may identify whether external light (or interference light 60) (hereinafter, also referred to as "second IR light") having an intensity of a threshold or higher is received by the IR receiver 1614 in the second time interval. The processor 1616 may be configured to, when the second IR light having an intensity of the threshold or higher is received by the IR receiver 1614 in the second time interval, stop transmitting the first IR transmission signal through the IR transmitter 1612. According to an embodiment, after the transmission of the first IR transmission signal is controlled to be stopped, the processor 1616 may control the IR transmitter 1612 to transmit a second IR transmission signal for notification of collision. After the transmission of the first IR transmission signal is stopped, when a designated interval time is satisfied, the processor 1616 may control the IR transmitter 212 to retransmit the first IR transmission signal. According to an embodiment, after the transmission of the first IR transmission signal is stopped, when the second IR transmission signal for notification of collision is transmitted, and then a designated interval time is satisfied, the processor 1616 may control the IR transmitter 1612 to retransmit the first IR transmission signal.

According to various embodiments, the charging device 1602 may include an infrared (IR) receiver 1654, a processor 1656, the docking part 1658, and/or a power supplier 1660.

According to an embodiment, the IR receiver 1654 may sense light from the outside through a light sensing element 1653, and may convert (or demodulate) an IR reception signal corresponding to the sensed light into an IR reception packet. For example, the IR receiver 1654 may obtain an IR reception signal, based on a first time interval in which IR light is sensed through the light sensing element 223, and a second time interval in which IR light is not sensed, and may demodulate the IR reception signal into an IR data packet, based on an IrDA demodulation scheme. According to an embodiment, the light sensing element 1653 may include a light sensor which converts received light energy into electrical energy. For example, the light sensor may include a photo diode.

According to an embodiment, the processor 1656 may: identify a first time interval and a second time interval corresponding to a first IR transmission signal received from the robot cleaner 1601; receive first IR light corresponding to at least a part of the first IR transmission signal from the robot cleaner 1601 in the first time interval; identify whether second IR light having an intensity of a threshold or higher is received in the second time interval; and if the second IR light is received in the second time interval, stop receiving the first IR transmission signal.

According to an embodiment, the docking part 1658 may sense docking between the charging device 1602 and the robot cleaner 1601. According to an embodiment, the power supplier 1660 may provide power to the robot cleaner 1601.

According to various embodiments, the processor 1656 may control the power supplier 1660 to provide power having a designated intensity to the robot cleaner 1601 as the robot cleaner 1601 is docked with the docking part 1658 of the charging device 1602.

According to an embodiment, after power having a designated intensity is provided to the robot cleaner 1601, the processor 1656 may receive a first IR data packet including the intensity of the received power from the robot cleaner 1601 through the IR receiver 1653. For example, the processor 1656 may receive first IR light during a first time interval corresponding to at least a part of a first IR transmission signal corresponding to the first IR data packet through the IR receiver 1653. According to an embodiment, the processor 1656 may recognize a first time interval and a second time interval in the received first IR transmission signal, in advance. For example, the processor 1656 may recognize that the second time interval exists next to the first time interval, in advance. The processor 1656 may receive first IR light sensed through the light sensing element 1653 in the first time interval, and may identify whether second IR light having an intensity of a threshold or higher is received through the light sensing element 1653 in the second time interval. If the second IR light having an intensity of the threshold or higher is received in the second time interval although light is required not to be received in the second time interval, the processor 1656 may stop receiving the first IR transmission signal. According to various embodiments, the threshold may be a signal intensity threshold designated to, when received light is converted into an electrical signal by the light sensing element 1653, determine the converted electrical signal as an IR light signal. For example, the designated signal intensity threshold may be specified to an intensity that is 20% or higher of that of transmitted IR light, or 30% or higher thereof.

According to various embodiments, if second IR light having an intensity of the threshold or higher is received by the IR receiver 1654 in the second time interval in which light is required not to be sensed, the processor 1656 may stop receiving the first IR transmission signal, and receive a second IR transmission signal for notification of collision from the robot cleaner 1601. According to an embodiment, after the reception of the first IR transmission signal is stopped, when a designated interval time is satisfied, the processor 1656 may control the IR receiver 1654 to re-receive the first IR transmission signal. According to an embodiment, after the reception of the first IR transmission signal is stopped, when the second IR transmission signal for notification of collision is received, and then a designated interval time is satisfied, the processor 1656 may control the IR receiver 1654 to re-receive the first IR transmission signal.

Figure 17:
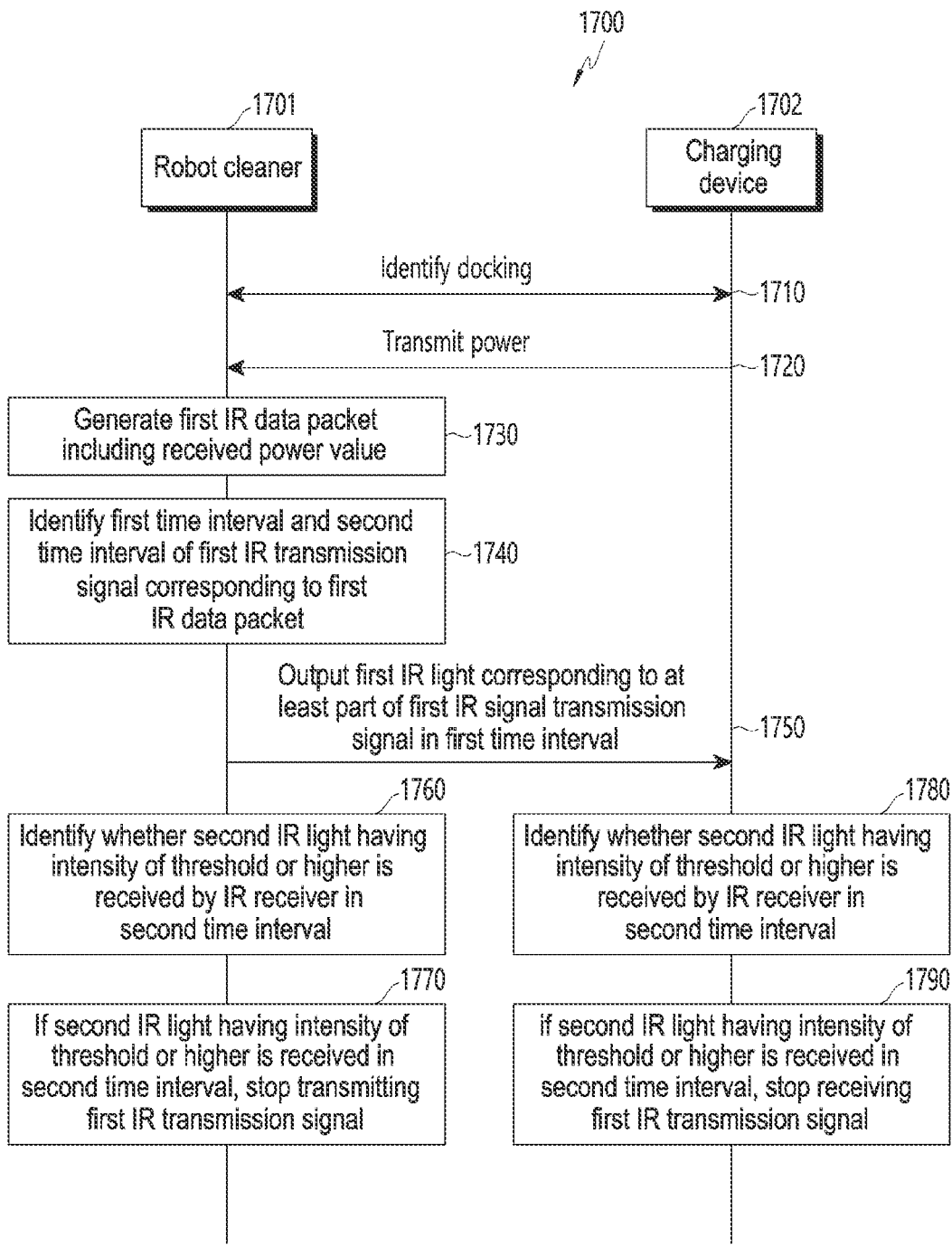
FIG. 17 is a flowchart illustrating an IR signal transmission/reception operation based on interference detection between a robot cleaner and a charging device according to various embodiments.

FIG. 17 is a flowchart 1700 illustrating an IR signal transmission/reception operation based on interference detection between a robot cleaner and a charging device according to various embodiments.

Operations 1710, 1720, and 1730-1770 according to various embodiments may be understood as operations performed by a processor (e.g., the processor 120 in FIG. 1, the processor 216 in FIG. 2, or the processor 1616 in FIG. 16, hereinafter, the following description will be given with the processor 1616 in FIG. 16, for example) of a robot cleaner 1701 (e.g., the electronic device 101 in FIG. 1, the first electronic device 201 in FIG. 2, the robot cleaner 1501 in FIG. 15, or the robot cleaner 1601 in FIG. 16). Operations 1710, 1720, 1780, and 1790 according to various embodiments may be understood as operations performed by a processor (e.g., the processor 120 in FIG. 1, the processor 226 in FIG. 2, or the processor 1656 in FIG. 16, hereinafter, the following description will be given with the processor 1656 in FIG. 16, for example) of a charging device 1702 (e.g., the electronic device 101 in FIG. 1, the second electronic device 202 in FIG. 2, the charging device 1502 in FIG. 15, or the electronic device 1602 in FIG. 16). According to an embodiment, at least one of operations 1710 to 1790 may be omitted, the order of some operations may be changed, or another operation may be added.

In operation 1710, the processor 1656 according to an embodiment may identify whether the robot cleaner 1701 has been docked through the docking part 1658 of the charging device 1702. The processor 1656 may transmit or receive an IR data packet associated with charging to or from the charging device 1702, based on an infrared communication protocol in the state where the robot cleaner 1701 has docked with the charging device 1702.

In operation 1720, the processor 1656 according to an embodiment may provide power having a designated intensity to the robot cleaner 1701 as the robot cleaner 1701 is docked with the docking part 1658 of the charging device 1702. The processor 1616 according to an embodiment may receive, through the power receiver 1637, power wiredly or wirelessly transmitted from the charging device 1702 as the robot cleaner 1701 is docked with the charging device 1702.

In operation 1730, the processor 1616 according to an embodiment may generate a first IR data packet including the intensity of the received power.

In operation 1740, the processor 1616 according to an embodiment may identify a first time interval and a second time interval of a first IR transmission signal corresponding to the first IR data packet. For example, the processor 1616 may identify, based on a logical value (e.g., "1" or "0") of a bit included in the data packet, a first time interval in which a designated first voltage (V1) (hereinafter, also referred to as a "high voltage" or "High") is required to be output, and a second time interval in which a designated second voltage (V2) (hereinafter, also referred to as a "low voltage" or "Low") is required to be output.

In operation 1750, the processor 1616 according to an embodiment may output first IR light corresponding to at least a part of the first IR transmission signal through the IR transmitter 1612 in the first time interval. For example, the processor 1656 may receive first IR light during a first time interval corresponding to at least a part of the first IR transmission signal corresponding to the first IR data packet through the IR receiver 1653.

In operation 1760, the processor 1616 according to an embodiment may identify whether second IR light (external light or interference light 60) having an intensity of a threshold or higher is received by the IR receiver 1614 in the second time interval.

In operation 1770, the processor 1616 according to an embodiment may be configured to, when the second IR light having an intensity of the threshold or higher is received by the IR receiver 1614 in the second time interval, stop transmitting the first IR transmission signal through the IR transmitter 1612. According to an embodiment, after the transmission of the first IR transmission signal is controlled to be stopped, the processor 1616 may control the IR transmitter 1612 to transmit a second IR transmission signal for notification of collision. After the transmission of the first IR transmission signal is stopped, when a designated interval time is satisfied, the processor 1616 may control the IR transmitter 212 to retransmit the first IR transmission signal. According to an embodiment, after the transmission of the first IR transmission signal is stopped, when the second IR transmission signal for notification of collision is transmitted, and then a designated interval time is satisfied, the processor 1616 may control the IR transmitter 1612 to retransmit the first IR transmission signal.

In operation 1780, the processor 1656 according to an embodiment may identify whether the second IR light having an intensity of the threshold or higher is received through the light sensing element 1653 in the second time interval. According to an embodiment, the processor 1656 may recognize a first time interval and a second time interval in the received first IR transmission signal, in advance. For example, the processor 1656 may recognize that the second time interval exists next to the first time interval, in advance. The processor 1656 may receive first IR light sensed through the light sensing element 1653 in the first time interval, and then identify whether the second IR light having an intensity of the threshold or higher is received through the light sensing element 1653 in the second time interval.

In operation 1790, when the second IR light having an intensity of the threshold or higher is received in the second time interval, the processor 1656 according to an embodiment may stop receiving the first IR transmission signal. After stopping the reception of the first IR transmission signal, the processor 1656 may receive a second IR transmission signal for notification of collision from the robot cleaner 1701. According to an embodiment, after the reception of the first IR transmission signal is stopped, when a designated interval time is satisfied, the processor 1656 may control the IR receiver 1654 to re-receive the first IR transmission signal. According to an embodiment, after the reception of the first IR transmission signal is stopped, when the second IR transmission signal for notification of collision is received, and then a designated interval time is satisfied, the processor 1656 may control the IR receiver 1654 to re-receive the first IR transmission signal.

Each of the constituent elements described in various embodiments of the disclosure may include one or more components, and the names of the corresponding elements may vary depending on the type of electronic device. In various embodiments, the electronic device may include at least one of the constituent elements disclosed herein. Some of the elements may be omitted from or other additional elements may be further included in the electronic device. Also, some of the constituent elements of the electronic device according to various embodiments may be combined into one entity, which may perform functions identical to those of the relevant elements before the combination.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. The "module" may be mechanically or electronically implemented. For example, the "module" may include at least one of an application-specific integrated circuit (ASIC) chip, field-programmable gate arrays (FPGAs), and a programmable logic device for performing known operations or operations to be developed in the future.

Devices (e.g., modules or functions thereof) and methods (e.g., operations) according to various embodiments may be implemented as instructions that are stored in the form of a program module in a computer-readable storage medium. The instructions, when executed by a processor (e.g., the processor 120), may cause the processor to perform one or more functions corresponding to the instructions. The computer-readable storage medium may be, for example, a memory 130.

Various embodiments may provide a storage medium in which commands are stored, the commands being configured to, when executed by at least one circuit, cause the at least one circuit to perform at least one operation, wherein the at least one operation includes operations of: identifying a first IR transmission signal to be transmitted to an external device; identifying a first time interval and a second time interval corresponding to the first IR transmission signal; outputting first IR light corresponding to at least a part of the first IR transmission signal through the IR transmitter in the first time interval; identifying whether second IR light having an intensity of a threshold or higher is received by the IR receiver in the second time interval; and when the second IR light is received by the IR receiver in the second time interval, stopping transmitting the first IR transmission signal.

The computer-readable storage medium may include a hard disc, a floppy disc, a magnetic medium (e.g., magnetic tape), an optical medium (e.g., compact disc read only memory (CD-ROM), digital versatile disc (DVD)), a magneto-optical medium (e.g., floptical disk), a hardware device (e.g., read only memory (ROM), random access memory (RAM), or flash memory), and the like. The program instructions may include machine language codes generated by a complier or computer-executable codes that can be executed using an interpreter or the like. The hardware device may be configured to operate as one or more software modules for operations according to various embodiments, and vice versa.

A module or program module according to various embodiments may include at least one of the above-described elements, exclude some of them, or further include additional other elements. According to various embodiments, operations performed by the module, the program, or another element may be carried out sequentially, in parallel, repeatedly, or heuristically. Further, some of the operations may be executed in a different order or omitted, or one or more other operations may be added.

It will apparent to those skilled in the art that the electronic device according to various embodiments of the disclosure as described above are not limited by the above-described embodiments and the drawings, and various alternatives, modifications, and changes may be made thereto within the technical scope of the disclosure.

What is claimed is:

1. An electronic device comprising:
   an IR (infrared) transmitter configured to output IR light;
   an IR receiver configured to receive IR light; and
   a processor configured to:
   identify a first IR transmission signal to be transmitted to an external device, the first IR transmission signal corresponding to a data packet including a plurality of parts;
   identify a first time interval and a second time interval for to a first part of the plurality of parts, the second time interval being subsequent to the first time interval;
   output, through the IR transmitter, first IR light corresponding to the first part of the data packet during the first time interval;
   receive, through the IR receiver, second IR light during the second time interval;
   identify whether the second IR light has an intensity equal to or greater than a threshold intensity;
   in accordance with identifying that the intensity is less than the threshold intensity, output, through the IR transmitter, IR light corresponding to other parts of the data packet; and
   in accordance with identifying that the intensity is equal to or greater than the threshold intensity, stop outputting the IR light corresponding to the other parts of the data packet through the IR transmitter.

2. The electronic device of claim 1, wherein the processor is configured to:
   receive, though the IR receiver, third IR light, before the first IR light is output through the IR transmitter;
   identify whether the third IR light has an intensity equal to or greater than the threshold intensity; and
   in accordance with identifying that the intensity of the third IR light is less than the threshold intensity, transmit the first IR light.

3. The electronic device of claim 2, wherein the processor is configured to, in accordance with identifying that the intensity of the third IR light is greater than or equal to the threshold intensity, output, through the IR transmitter, fourth IR light for a notification of collision.

4. The electronic device of claim 1, wherein the processor is configured to, in case that a designated interval time has passed since stopping of the outputting of the IR light corresponding to the other parts of the data packet, output, through the IR transmitter, the IR light corresponding to the other parts of the data packet.

5. The electronic device of claim 1, wherein the IR transmitter is configured to output IR light based on a first voltage, and
   to not output IR light based on a second voltage different from the first voltage.

6. An electronic device comprising:
   an infrared (IR) receiver configured to receive IR light; and
   a processor configured to:
   identify a first time interval and a second time interval for a first part of a plurality of parts of data packet corresponding to a first IR transmission signal from an external device;
   receive, from the external device, through the IR receiver, first IR light corresponding to the first part of the plurality of parts during the first time interval;
   identify whether second IR light having an intensity equal to or greater than a threshold intensity is received through the IR receiver during the second time interval;
   in accordance with identifying that the intensity is less than the threshold intensity. receive, through the IR receiver, IR light corresponding to other parts of the data packet; and
   in accordance with identifying that the intensity is equal to or greater than the threshold intensity, stop receiving the IR light corresponding to the other parts of the data packet through the IR receiver.

7. The electronic device of claim 6, wherein the processor is configured to receive IR light for a notification of collision after stopping receiving of the first IR light.

8. The electronic device of claim 6, wherein the processor is configured to, in case that a designated interval time has passed since stopping of the receiving of the IR light corresponding to the other parts of the data packet, receive, through the IR receiver, the IR light corresponding to the other parts of the data packet.

9. The electronic device of claim 6, wherein the first IR light corresponds to a first voltage.

10. An infrared communication method for an electronic device, the method comprising:
- identifying a first IR transmission signal to be transmitted to an external device, the first IR transmission signal corresponding to a data packet including a plurality of parts;
- identifying a first time interval and a second time interval for a first part of the plurality of parts, the second time interval being subsequent to the first time interval;
- outputting, through an IR transmitter, first IR light corresponding to the first part of the data packet during the first time interval;
- receiving, through an IR receiver, second IR light during the second time interval;
- identifying whether the second IR light has an intensity equal to or greater than a threshold intensity;
- in accordance with identifying that the intensity is less than the threshold intensity, outputting, through the IR transmitter, IR light corresponding to other parts of the data packet; and
- in accordance with identifying that the intensity is equal to or greater than the threshold intensity, stopping outputting IR light corresponding to the other parts of the data packet through the IR transmitter.

11. The method of claim 10, further comprising:
- receiving, through the IR receiver, third IR light, before the first IR light is output through the IR transmitter;
- identifying whether the third IR light has an intensity equal to or greater than the threshold intensity;
- in accordance with identifying that the intensity of the third IR light is less than the threshold intensity, transmitting the first IR light; and
- in accordance with identifying that the intensity of the third IR light is equal to or greater than the threshold intensity, outputting, through the IR transmitter, fourth IR light for a notification of collision.

12. The method of claim 10, further comprising, in case that a designated interval time has passed since stopping of outputting the IR light corresponding to the other parts of the data packet, outputting, through the IR transmitter, the IR light corresponding to the other parts of the data packet.

13. The method of claim 10, wherein the first IR light is output based on a first voltage, and the first IR light is not output based on a second voltage.

14. An infrared communication method for an electronic device, the method comprising:
- identifying a first time interval and a second time interval for a first part of a plurality of parts of a data packet corresponding to a first IR transmission signal from an external device;
- receiving, from the external device, through an IR receiver, first IR light corresponding to the first part of the plurality of parts during the first time interval;
- identifying whether second IR light having an intensity equal to or greater than a threshold intensity is received through the IR receiver during the second time interval;
- in accordance with identifying that the intensity is less than the threshold intensity, receive, through the IR receiver, IR light corresponding to other parts of the data packet; and
- in accordance with identifying that the intensity is equal to or greater than the threshold intensity, stopping receiving the IR light corresponding to the other parts of the data packet through the IR receiver.

15. The method of claim 14, further comprising:
- receiving IR light for a notification of collision after stopping receiving of the first IR light; and
- in case that a designated interval time has passed since stopping of the receiving of the IR light corresponding to the other parts of the data packet, receiving ,through the IR receiver, the IR light corresponding to the other parts of the data packet.

16. The method of claim 14, wherein the first IR light corresponds to a first voltage.

* * * * *